(12) United States Patent
Nishiguchi et al.

(10) Patent No.: US 11,490,277 B2
(45) Date of Patent: Nov. 1, 2022

(54) COMMUNICATION APPARATUS, COMMUNICATION SYSTEM, AND COMMUNICATION CONTROL METHOD

(71) Applicant: FUJITSU LIMITED, Kawasaki (JP)

(72) Inventors: Yuki Nishiguchi, Kawasaki (JP); Ai Yano, Kawasaki (JP); Shigeki Fukuta, Setagaya (JP); Jun Kakuta, Yokohama (JP); Nami Nagata, Kawasaki (JP); Ryuichi Matsukura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 16/110,619

(22) Filed: Aug. 23, 2018

(65) Prior Publication Data

US 2019/0075474 A1 Mar. 7, 2019

(30) Foreign Application Priority Data

Sep. 4, 2017 (JP) .............................. JP2017-169568

(51) Int. Cl.
*H04W 24/08* (2009.01)
*H04L 43/0852* (2022.01)
*H04L 43/0829* (2022.01)
*H04W 84/18* (2009.01)
*H04L 43/10* (2022.01)

(52) U.S. Cl.
CPC ......... *H04W 24/08* (2013.01); *H04L 43/0835* (2013.01); *H04L 43/0858* (2013.01); *H04L 43/10* (2013.01); *H04W 84/18* (2013.01)

(58) Field of Classification Search
None
See application file for complete search history.

(56) References Cited

U.S. PATENT DOCUMENTS

| 7,031,322 B1 * | 4/2006 | Matsuo ............... H04L 12/5601 370/395.1 |
| 2006/0056382 A1 * | 3/2006 | Yamada ................ H04W 28/18 370/349 |

(Continued)

FOREIGN PATENT DOCUMENTS

| JP | 2007-158976 A | 6/2007 |
| JP | 2010-183215 A | 8/2010 |

(Continued)

*Primary Examiner* — Jeffrey M Rutkowski
*Assistant Examiner* — Mehedi S Aley
(74) *Attorney, Agent, or Firm* — ArentFox Schiff LLP

(57) ABSTRACT

A communication apparatus that transmits and receives packet data by radio communication with another communication apparatus, the communication apparatus including a memory; and a processor coupled to the memory and the processor configured to: receive first packet data in a first packet transmission period; calculate data collection efficiency indicating a ratio of a reception data amount of the first packet data, to a transmission data amount of the first packet data, based on received the first packet data, and measure a first radio quality in a radio section between the communication apparatus and the other communication apparatus, based on received the first packet data; calculate a packet length and transmission count of the first packet data, based on the data collection efficiency and first radio quality; and transmit a second packet data including the packet length and transmission count.

19 Claims, 22 Drawing Sheets

(56) References Cited

U.S. PATENT DOCUMENTS

| | | | |
|---|---|---|---|
| 2009/0080459 A1* | 3/2009 | Barkan | H04L 49/9078 370/463 |
| 2009/0238075 A1* | 9/2009 | Mosko | H04L 45/123 370/238 |
| 2009/0296631 A1* | 12/2009 | Takahashi | H04W 56/001 370/328 |
| 2010/0246507 A1 | 9/2010 | Dan | |
| 2011/0286340 A1* | 11/2011 | Janecek | H04L 1/1829 370/252 |
| 2013/0034001 A1* | 2/2013 | Mizusawa | H04W 16/14 370/252 |
| 2014/0105058 A1* | 4/2014 | Hu | H04W 24/08 370/253 |
| 2014/0204778 A1* | 7/2014 | Saito | H04L 43/10 370/252 |
| 2016/0302096 A1* | 10/2016 | Chari | H04W 40/12 |
| 2017/0339339 A1* | 11/2017 | De Bayser | H04N 5/23216 |
| 2018/0098362 A1* | 4/2018 | Yamauchi | H04W 74/085 |
| 2018/0248811 A1* | 8/2018 | Di Nallo | H04L 47/564 |

FOREIGN PATENT DOCUMENTS

| | | |
|---|---|---|
| JP | 2010-233137 A | 10/2010 |
| JP | 2012-080448 A | 4/2012 |
| JP | 2014-233054 A | 12/2014 |
| JP | 2015-041821 A | 3/2015 |

\* cited by examiner

FIG. 12

| PACKET TRANSMISSION SECTION | SENSOR-SIDE RADIO QUALITY | | RT | COLLECTION TERMINAL-SIDE RADIO QUALITY | | TRANSMISSION COUNT | DATA COLLECTION EFFICIENCY |
|---|---|---|---|---|---|---|---|
| | RSSI | LQI | | RSSI' | LQI' | | |
| 1 | $rssi_1$ | $lqi_1$ | $rt_1$ | $rssi'_1$ | $lqi'_1$ | $n_1=[L_{Sendable}/L_{MAX}]$ | $\eta_1$ |
| 2 | $rssi_2$ | $lqi_2$ | $rt_2$ | $rssi'_2$ | $lqi'_2$ | $n_2=n_1+1$ | $\eta_2$ |
| ... | ... | ... | ... | ... | ... | ... | ... |
| k | $rssi_k$ | $lqi_k$ | $rt_k$ | $rssi'_k$ | $lqi'_k$ | $n_k=n_{k+1}+1$ | $\eta_k$ |
| ... | ... | ... | ... | ... | ... | ... | ... |
| j-1 | $rssi_{j-1}$ | $lqi_{j-1}$ | $rt_{j-1}$ | $rssi'_{j-1}$ | $lqi'_{j-1}$ | $n_{j-1}$ | $\eta_{j-1}$ |

| PACKET TRANSMISSION SECTION | RSSI | LQI | RT | RSSI' | LQI' | TRANSMISSION COUNT | DATA COLLECTION EFFICIENCY | CLUSTER |
|---|---|---|---|---|---|---|---|---|
| 1 | $rssi_1$ | $lqi_1$ | $rt_1$ | $rssi'_1$ | $lqi'_1$ | $n_1 = [L_{Sendable}/L_{MAX}]$ | $\eta_1$ | A |
| 2 | $rssi_2$ | $lqi_2$ | $rt_2$ | $rssi'_2$ | $lqi'_2$ | $n_2 = n_1 + 1$ | $\eta_2$ | C |
| ... | ... | ... | ... | ... | ... | ... | ... | |
| N | $rssi_N$ | $lqi_N$ | $rt_N$ | $rssi'_N$ | $lqi'_N$ | $n_N = n_N + 1$ | $\eta_N$ | B |
| ... | | | | | | ... | ... | ... |
| j-1 | $rssi_{j-1}$ | $lqi_{j-1}$ | $rt_{j-1}$ | $rssi'_{j-1}$ | $lqi'_{j-1}$ | $n_{j-1}$ | $\eta_{j-1}$ | B |
| j | | | | | | $n_j = n_k (= n_N + 1)$ | | |

107

CLUSTERING BASED ON RADIO QUALITY

CLUSTER TO WHICH PACKET TRANSMISSION SECTION IMMEDIATELY BEFORE BELONGS.

FIG. 14

| PACKET TRANSMISSION SECTION | RSSI | LQI | RT | RSSI' | LQI' | TRANSMISSION COUNT | DATA COLLECTION EFFICIENCY | CLUSTER |
|---|---|---|---|---|---|---|---|---|
| 1 | $rssi_1$ | $lqi_1$ | $rt_1$ | $rssi_1'$ | $lqi_1'$ | $n_1 = [L_{Sendable}/L_{MAX}]$ | $\eta_1$ | A |
| 2 | $rssi_2$ | $lqi_2$ | $rt_2$ | $rssi_2'$ | $lqi_2'$ | $n_2 = n_1 + 1$ | $\eta_2$ | C |
| ... | ... | ... | ... | ... | ... | ... | ... | ... |
| N | $rssi_N$ | $lqi_N$ | $rt_N$ | $rssi_N'$ | $lqi_N'$ | $n_N = n_N + 1$ | $\eta_N$ | B |
| ... | ... | ... | ... | ... | ... | ... | ... | ... |
| j-1 | $rssi_{j-1}$ | $lqi_{j-1}$ | $rt_{j-1}$ | $rssi_{j-1}'$ | $lqi_{j-1}'$ | $n_{j-1}$ | $\eta_{j-1}$ | B |
| i | | | | | | $n_i = n_k$ | | |

107

→ DELETE

COMMUNICATION APPARATUS, COMMUNICATION SYSTEM, AND COMMUNICATION CONTROL METHOD

CROSS-REFERENCE TO RELATED APPLICATION

This application is based upon and claims the benefit of priority of the prior Japanese Patent Application No. 2017-169568, filed on Sep. 4, 2017, the entire contents of which are incorporated herein by reference.

FIELD

The embodiments discussed herein are related to a communication apparatus, a communication system, and a communication control method.

BACKGROUND

In recent years, a variety of things not only a personal computer and a smartphone are getting connected to the Internet. Accordingly IoT (Internet of Things) is drawing attention.

The IoT is said to be a mechanism that a variety of "things" are connected to the Internet to enable mutual control through information exchange. The "things" here include, for example, a smartphone having an IP (Internet Protocol) address, a commercial product having an IP address and being detectable by a sensor, a content stored in equipment having an IP address, and the like. The IoT is considered to enable, for example, smooth circulation of a vast amount of information, to improve productivity and efficiency on the life of the people and achieve a new social system.

In some cases, an IoT network may be implemented using radio communication. However, such radio communication may be affected by an external environment, so that may generate a fault. Therefore, there may be cases that an IoT service through the IoT network is hindered.

For example, cases of IoT introduced in a factory are increasing. In some cases in such a factory, semiconductor manufacturing equipment, drying equipment, etc. using a magnetron in an ISM (Industry Science Medical) band may be operated inside the factory. Such equipment may become an interference source upon IoT equipment that performs radio communication using an identical frequency band. It is known that the periodic control of a magnetron switched on and off generates a periodic interference upon radio communication performed in an identical frequency band.

Such periodic interference may cause the omission of a transmission packet in the middle of communication in a radio section to thereby deteriorate a data throughput.

As a radio communication technique to deal with the periodic interference including the followings, for example.

Namely, there is a radio communication apparatus that inserts the measured periodic data of an interference wave into a transmission packet as a part of transmission data, to transmit to another radio communication apparatus, so that the other radio communication apparatus adjusts the transmission time of each one transmission based on the periodic data of the interference wave.

It is urged that, according to the above technique, in radio communication with another radio communication apparatus, it is possible to reduce a periodically generated interference wave, and prevent an inappropriate increase of transmission power.

Also, there is a communication apparatus that identifies a time length of a non-signal section in which any signal from another apparatus is detected, and based on the time length of data to be transmitted to an opposite apparatus of communication and the time length of the non-signal section, determines the number of times of data transmission, so as to transmit data as many as the determined number of times to the opposite apparatus.

It is urged that, according to the above technique, a delay in a communication system can be reduced while reducing the probability of the collision of a transmission signal with a signal from the other apparatus.

Further, there is a communication apparatus that, on determining periodicity exists in a noise signal, continues communication if the communication is not hindered because a target signal level to a noise level is sufficiently large, while maintaining a normal operation state without switching over an operation state, whereas otherwise, reduces a transmission speed.

It is urged that, according to the above technique, packet communication can be performed without hindrance, even under an environment in which a noise signal having periodicity exists.

PRIOR TECHNICAL DOCUMENTS

Patent Documents

[Patent document 1] Japanese Laid-open Patent Publication No. 2012-80448
[Patent document 2] Japanese Laid-open Patent Publication No. 2015-41821
[Patent document 3] Japanese Laid-open Patent Publication No. 2007-158976

However, the technique of inserting and transmitting the periodic data of the interference wave aims at adjusting a transmission time in another radio communication apparatus, and no consideration is given at all on radio quality at the transmission time. Therefore, according to such a technique, if the other radio communication apparatus transmits transmission data at the transmission time, a radio communication apparatus may fail to normally receive the data due to deteriorated radio quality. Thus, according to the technique, a data throughput may be deteriorated.

Further, according to the technique of determining the number of times of data transmission based on the time length of data to be transmitted to the communication opposite apparatus and the time length of a non-signal section, no consideration is made at all on radio quality at the data transmission time. Therefore, according to the technique, a data throughput may be deteriorated.

Moreover, according to the technique of performing communication with a maintained normal operation state if a target signal level to a noise level is sufficiently large, causing no hindrance on communication, packet communication may be continued if a noise signal exists. Therefore, according to such a technique, the noise signal may affect packet communication, so that the reception side may fail to normally receive a transmission packet. According to the technique therefore, a data throughput may be deteriorated.

SUMMARY

According to an aspect of the embodiments, a communication apparatus that transmits and receives packet data by radio communication with another communication apparatus, the communication apparatus including: a memory; and a processor coupled to the memory and the processor configured to: receive first packet data transmitted from the other communication apparatus in a first packet transmission period; calculate data collection efficiency indicating a ratio of a reception data amount of the first packet data received in the communication apparatus, to a transmission data amount of the first packet data transmitted from the other communication apparatus, based on received the first packet data, and measure a first radio quality in a radio section between the communication apparatus and the other communication apparatus, based on received the first packet data; calculate a packet length and transmission count of the first packet data transmitted from the other communication apparatus, based on the data collection efficiency and first radio quality; and transmit a second packet data including the packet length and transmission count to the other communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram illustrating an example of a control table.

FIG. 13 is a diagram illustrating an example of a control table.

FIG. 14 is a diagram illustrating an example of a control table.

DESCRIPTION OF EMBODIMENTS

Hereinafter, the embodiments of the present invention will be described in detail by reference to the drawings. The problem and the embodiments of the present specification is one example and not intended to limit the scope of right of the present application. Further, the embodiments may appropriately be combined within a range not causing a contradiction between each processing content.

First Embodiment

<Configuration Example of Communication System>

Figure 1:
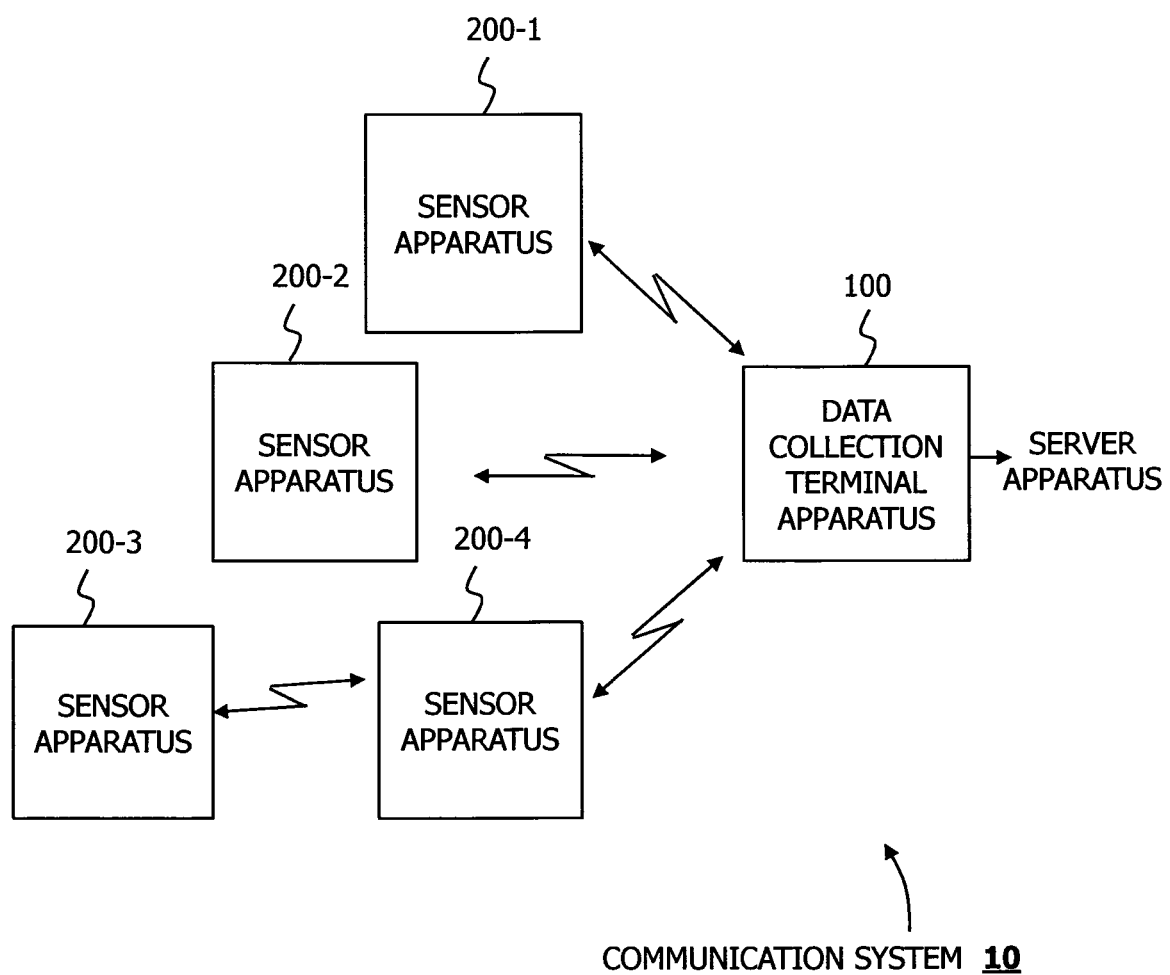
FIG. 1 is a diagram illustrating a configuration example of a communication system.

FIG. 1 is a diagram illustrating a configuration example of a communication system 10 according to a first embodiment.

The communication system 10 includes a data collection terminal apparatus (which may hereafter be referred to as "terminal") 100, and sensor apparatuses (which may hereafter be referred to as "sensors") 200-1 to 200-4. The communication system 10 is, for example, an IoT network system.

The terminal 100 is a communication apparatus that performs radio communication between the sensors 200-1 to 200-4 and a server apparatus. The terminal 100 plays a role as a gateway between the sensors 200-1 to 200-4 and the server apparatus.

The terminal 100 receives packet data (which may hereafter be referred to as a "packet") transmitted from the sensors 200-1 to 200-4 and extracts measurement data, measured by the sensors 200-1 to 200-4, from the received packet data. The terminal 100 then transmits the extracted measurement data to the server apparatus (or cloud apparatus). The transmission to the server apparatus may be executed through radio or wire, for example. The measurement data having been transmitted to the server apparatus may be transmitted from the server apparatus through the Internet to a personal computer etc., so that may be provided for a variety of uses as IoT data.

Further, the terminal 100 transmits packet data that includes sensor communication control parameter etc. to the sensors 200-1 to 200-4. The sensor communication control parameter is control parameter when the sensors 200-1 to 200-4 transmit the packet data, for example. The details will be described later.

Each sensor 200-1 to 200-4 is a communication apparatus that performs radio communication with the terminal 100, for example. The sensor 200-1 to 200-4 measures, for example, a variety of phenomena to transmit to the terminal 100 measurement data, including temperature, humidity, electricity consumption, gas consumption, etc. The measurement data may also be referred to as IoT data, for example. In the present first embodiment, the measurement data may be referred to as user data. The sensor 200-1 to 200-4 transmits a packet, including the user data, to the terminal 100 according to the sensor communication control parameter transmitted from the terminal 100.

Here, a radio communication method between the terminal 100 and each sensor 200-1 to 200-4 may be a carrier sensing method, a frequency hopping method, or the like, for example. In the carrier sensing method, for example, the terminal 100 or each sensor 200-1 to 200-4, when performing radio communication, verifies whether or not an identical frequency is occupied by another terminal so as not to transmit a plurality of carrier waves using the identical frequency. The carrier sensing method includes, for example, WiFi, ZigBee, etc. On the other hand, in the frequency hopping method, radio communication is performed while switching over a frequency within a predetermined frequency band. The frequency hopping method includes, for example, Bluetooth (Registered Trademark) and the like.

Further, as depicted in FIG. 1, each sensor 200-1 to 200-4 may directly perform radio communication with the terminal 100, like the sensors 200-1, 200-2. Also, each sensor 200-1 to 200-4 may perform radio communication with the terminal 100 through another sensor 200-4 (or by relaying), like the sensor 200-3. Further, the sensors 200-1 to 200-4 may be one unit or a plurality of units, though the example of four units are depicted in the example of FIG. 1.

Hereafter, because of an identical configuration, the sensors 200-1 to 200-4 may be referred to as sensor 200.

Next, each configuration example of the terminal 100 and the sensor 200 will be described.

<Configuration Example of Data Collection Terminal Apparatus>

Figure 2:
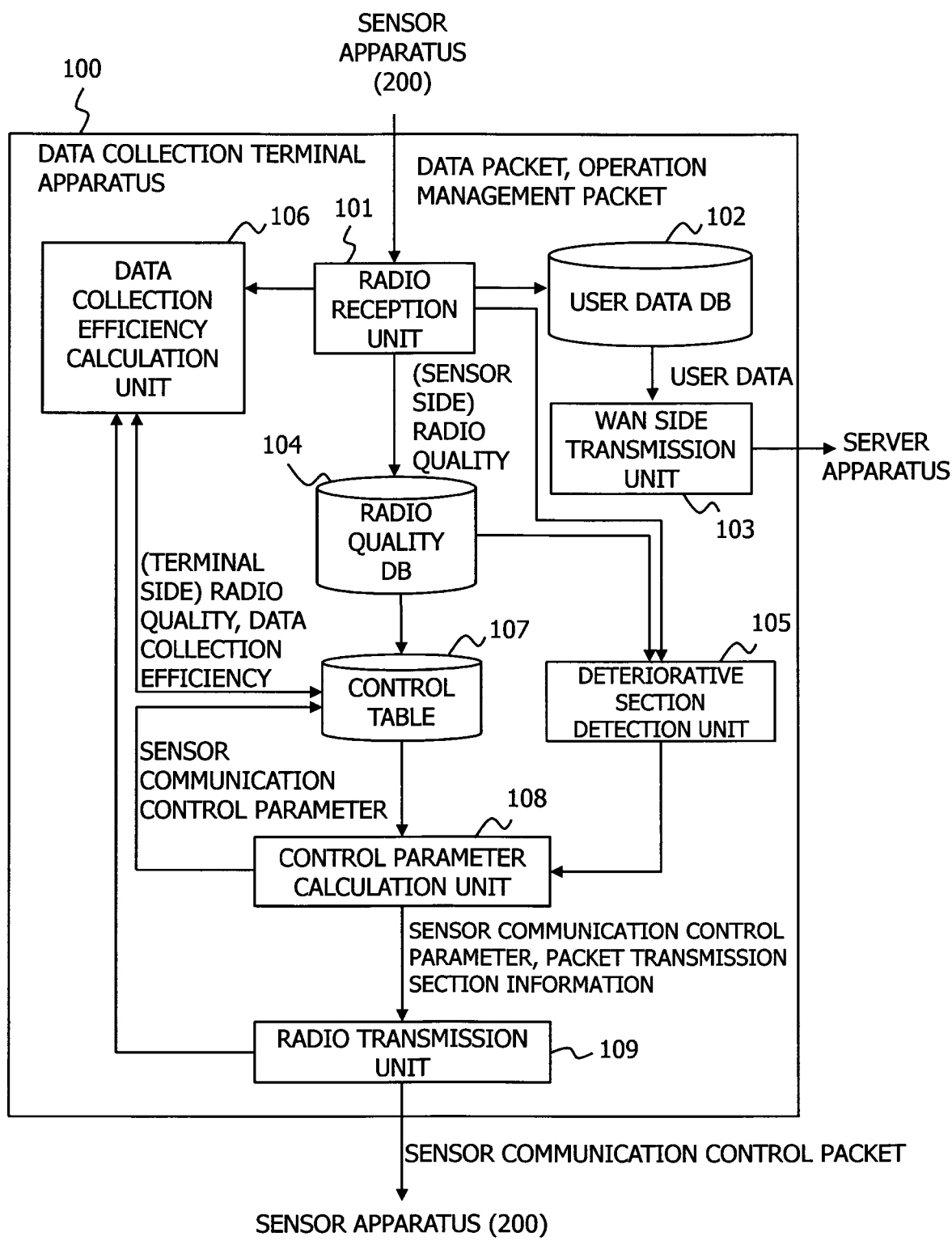
FIG. 2 is a diagram illustrating a configuration example of a data collection terminal apparatus.

FIG. 2 is a diagram illustrating a configuration example of the terminal 100. The terminal 100 includes a radio reception unit 101, a user data DB (Data Base) 102, a WAN (Wide Area Network) side transmission unit 103, a radio quality DB 104, a deteriorative section detection unit 105, a data collection efficiency calculation unit 106, a control table 107, a control parameter calculation unit 108, and a radio transmission unit 109.

The radio reception unit 101 receives a packet transmitted from the sensor 200. As packet types, there is the packet including user data (which may be referred to as a "data packet"), or the packet including operation management data (which may be referred to as an "operation management packet"), etc. The operation management data signifies data to be used for monitoring radio quality, for example. The operation management data includes, for example, a ping response time, an RSSI (Received Signal Strength Indicator), an LQI (Link Quality Indicator), etc. The details will be described later. The radio reception unit 101 receives a radio signal transmitted from the sensor 200, and performs demodulation processing on the received radio signal to extract a packet from the radio signal.

The radio reception unit 101 extracts the user data from the packet, and stores the extracted user data into the user data DB 102. Also, the radio reception unit 101 extracts the operation management data from the packet, and stores the extracted operation management data into the radio quality DB 104, as radio quality on the sensor side. Further, the radio reception unit 101 outputs the extracted packet to the data collection efficiency calculation unit 106.

The user data DB 102 stores the user data transmitted from the sensor 200.

The WAN side transmission unit 103 reads out the user data from the user data DB 102, and generates a packet including the user data to transmit the generated packet to the server apparatus.

The radio quality DB 104 stores radio quality on the sensor side, for example. As mentioned above, as sensor side radio quality, there are a ping response time, an RSSI, an LQI, etc., for example.

The deteriorative section detection unit 105 reads out a ping response time from the radio quality DB 104. Based on the readout ping response time, the deteriorative section detection unit 105 detects a periodic deteriorative section of radio quality (or a deteriorative period, which may hereafter be referred to as "deteriorative section"). Each section other than the deteriorative section comes to a satisfactory section (or a satisfactory period, which may hereafter be referred to as "satisfactory section"). The detection method of the periodic deteriorative section will be described in the operation example. The deteriorative section detection unit 105 outputs to the control parameter calculation unit 108 the start time and the end time of the deteriorative section and also the start time and the end time of the satisfactory section, for example. By the detection of the periodic deteriorative section, the deteriorative section detection unit 105 sets the satisfactory section.

In the followings, the "section" and the "period" may be used without discrimination. For example, there are cases of using a notification section and a notification period without discrimination, and also cases of using a packet transmission section and a packet transmission period without discrimination.

The data collection efficiency calculation unit 106 calculates, based on the packet received in the terminal 100, data collection efficiency that indicates a ratio of a reception data amount of packets received in the terminal 100 to an transmission data amount of packets transmitted from the sensor 200, for example. The calculation method of data collection efficiency will be described in the operation example. The data collection efficiency calculation unit 106 stores the calculated data collection efficiency into the control table 107.

Further, the data collection efficiency calculation unit 106 measures the radio quality of a radio section between the terminal 100 and the sensor 200, based on a packet received from the radio reception unit 101. The data collection efficiency calculation unit 106 stores the measured radio quality into the control table 107, as radio quality on the terminal side.

The control table 107 stores radio quality on the sensor side, which is stored in the radio quality DB 104, radio quality on the terminal side, the data collection efficiency and a sensor communication control parameter.

FIG. 12 is a diagram illustrating an example of the control table 107. As depicted in FIG. 12, for each packet transmission section, the radio quality, the data collection efficiency and the sensor communication control parameter are stored in the control table 107. In the example of FIG. 12, the number of times of transmission (hereafter, a transmission count) is stored in the control table 107, as an example of the sensor communication control parameter. The details of FIG. 12 will be described in the operation example. Referring back to FIG. 2, as to the control table 107, the sensor side radio quality is read out from the radio quality DB 104 by the control parameter calculation unit 108, so that the readout sensor side radio quality is stored into the control table 107.

The control parameter calculation unit 108 determines the packet length and the transmission count of each packet to be transmitted from the sensor 200, based on the data collection efficiency and the radio quality. The packet length is the length of a data packet or an operation management packet to be transmitted in a packet transmission section, for example. Also, the transmission count represents the number of packets to be transmitted from the sensor 200 to the terminal 100 in the packet transmission section, for example. The determination method of the packet length and the transmission count will be described in the operation example. Here, the packet length and the transmission count which are determined in the control parameter calculation unit 108 may be referred to as sensor communication control parameter, for example. The control parameter calculation unit 108 outputs the sensor communication control parameter to the radio transmission unit 109.

Further, the control parameter calculation unit 108 determines the start time and the end time of the packet transmission section based on the start time and the end time of the satisfactory section received from the deteriorative section detection unit 105. Here, the start time and the end time of the packet transmission section may be referred to as packet transmission section information, for example. The control parameter calculation unit 108 outputs the packet transmission section information to the radio transmission unit 109.

The radio transmission unit 109, on receiving from the control parameter calculation unit 108 the sensor communication control parameter and the packet transmission section information, generates a sensor communication control packet, inclusive thereof, to transmit the generated sensor communication control packet to the sensor 200. For example, the radio transmission unit 109 executes modulation processing etc. on the communication control packet to convert the communication control packet into a radio signal, so as to transmit the converted radio signal to the sensor 200. The sensor 200 transmits each packet to the terminal 100 according to the sensor communication control parameter.

<Configuration Example of Sensor Apparatus>

Figure 3:
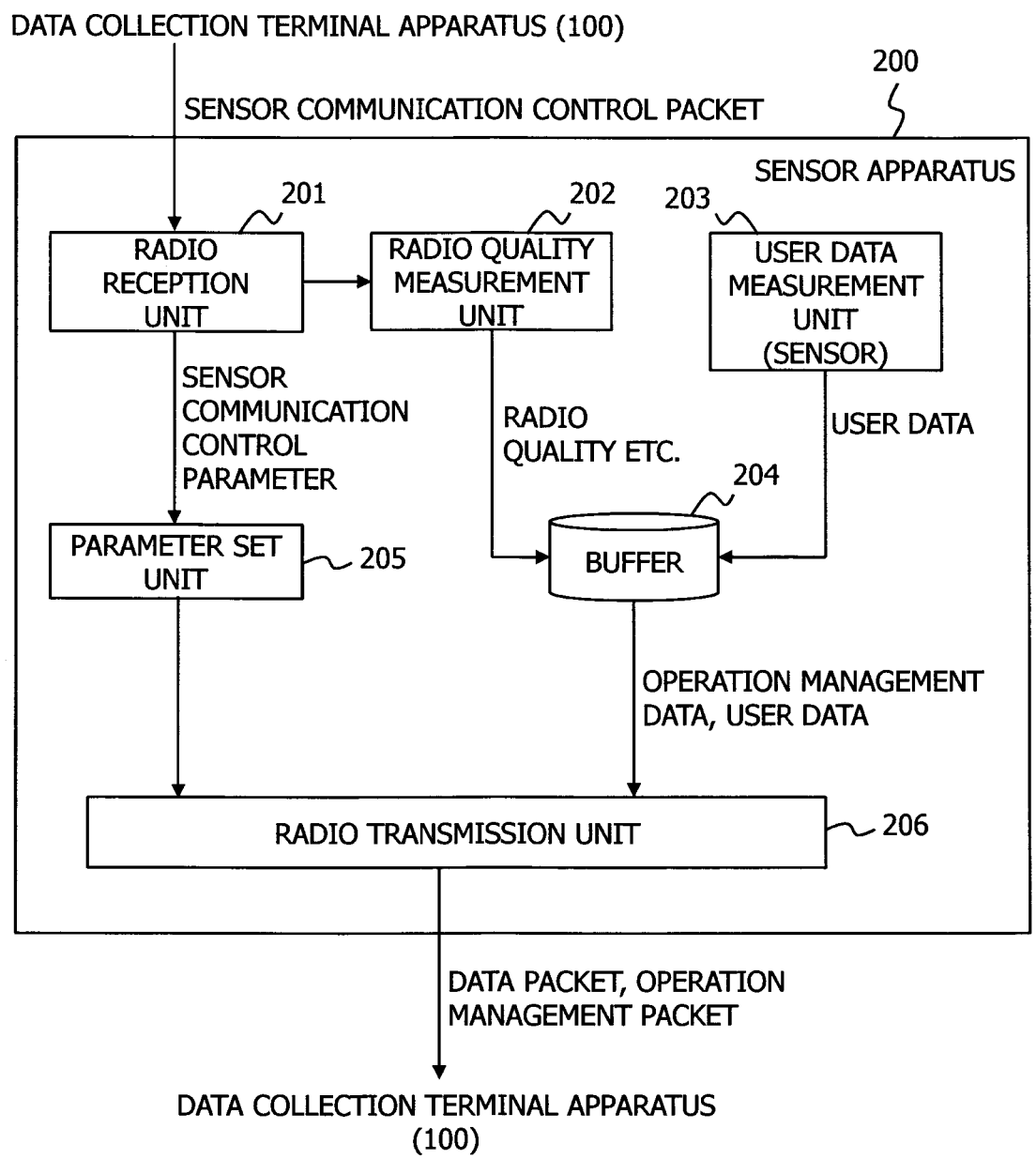
FIG. 3 is a diagram illustrating a configuration example of a sensor apparatus.

FIG. 3 is a diagram illustrating a configuration example of the sensor 200. The sensor 200 includes a radio reception unit 201, a radio quality measurement unit 202, a user data measurement unit 203, a buffer 204, a parameter set unit 205, and a radio transmission unit 206.

The radio reception unit 201 receives a sensor communication control packet transmitted from the terminal 100. For example, the radio reception unit 201 receives a radio signal transmitted from the terminal 100, and executes demodulation processing etc. on the received radio signal to extract the sensor communication control packet from the radio signal. The radio reception unit 201 then extracts a sensor communication control parameter from the sensor communication control packet to output to the parameter set unit 205. Also, the radio reception unit 201 outputs the extracted sensor communication control packet to the radio quality measurement unit 202.

The radio quality measurement unit 202 measures radio quality based on the sensor communication control packet received from the radio reception unit 201. As the radio quality, there are RSSI, LQI, response time, etc. The measurement method will be described in the operation example. The radio quality measurement unit 202 stores the measured radio quality into the buffer 204.

The user data measurement unit 203 is, for example, a sensor that measures a target phenomenon to generate user data. The user data measurement unit 203 stores the generated user data into the buffer 204.

The buffer 204 stores the radio quality and the user data.

The parameter set unit 205 performs setting related to the transmission of the packet to the radio transmission unit 206, according to the sensor communication control parameter. For example, the parameter set unit 205 sets to the radio transmission unit 206 the start time and the end time of the packet transmission section, so that the radio transmission unit 206 can transmit each data packet and operation management packet from the start time to the end time of the packet transmission section.

The radio transmission unit 206 reads out the radio quality and the user data from the buffer 20, and generates a data packet, including the user data, and an operation management packet, including the radio quality and the user data, to output to the terminal 100. For example, the radio transmission unit 206, after generating the packet, executes modulation processing etc. on the generated packet to convert the packet into a radio signal, and then transmits the converted radio signal to the terminal 100.

<Packet Transmission Section>

Figure 4:
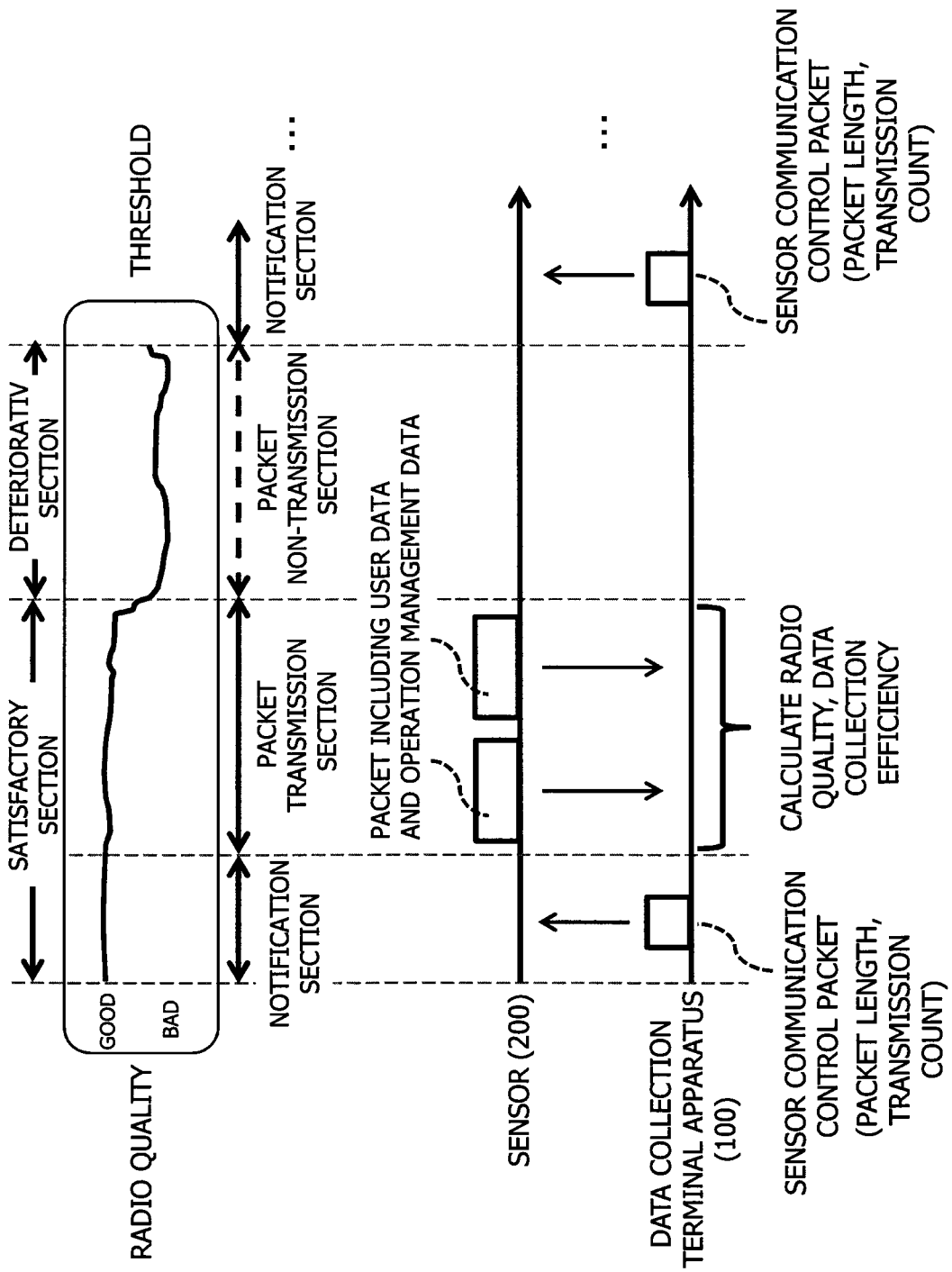
FIG. 4 is a diagram illustrating an example of a satisfactory section and a deteriorative section.

A packet transmission section will be described below. FIG. 4 is a diagram illustrating an example of the packet transmission section. In the present first embodiment, the terminal 100 sets a satisfactory section and a deteriorative section to determine a part of the satisfactory section to be a packet transmission section and sets the other remaining section to be a notification section. The terminal 100 transmits a sensor communication control packet in the notification section. On the other hand, the sensor 200 transmits an operation management packet in the packet transmission section. The terminal 100 and the sensor 200 do not exchange packet in the deteriorative section, whereas execute packet exchange in the satisfactory section.

In the notification section, the terminal 100 transmits a sensor communication control packet that includes a packet length and a transmission count. In the packet transmission section, the sensor 200 transmits to the terminal 100 an operation management packet having the instructed packet length as many as the instructed transmission count.

The terminal 100, based on the received operation management packet, calculates radio quality and data collection efficiency. Then, based on the calculated radio quality and the data collection efficiency, the terminal 100 determines the packet length and the transmission count of the operation management packet which are to be transmitted from the sensor 200 in the next satisfactory section.

In the satisfactory section arriving next, the terminal 100 transmits a sensor communication control packet in the notification section. In this case, the terminal 100 transmits, by including in the sensor communication control packet, the packet length and the transmission count that have been determined in one packet transmission section before. In the packet transmission section of the next satisfactory section, the sensor 200 transmits the operation management packet based on the packet length and the transmission count that are included in the above communication control packet.

Thereafter, the transmission of the sensor communication control packet and the transmission of the operation management packet are performed in repetition as many as a predetermined count.

<Operation Example>

An operation example on the terminal 100 side will be described first, followed by an operation example on the sensor 200 side.

<1. Operation Example on the Terminal Side>

Figure 5:
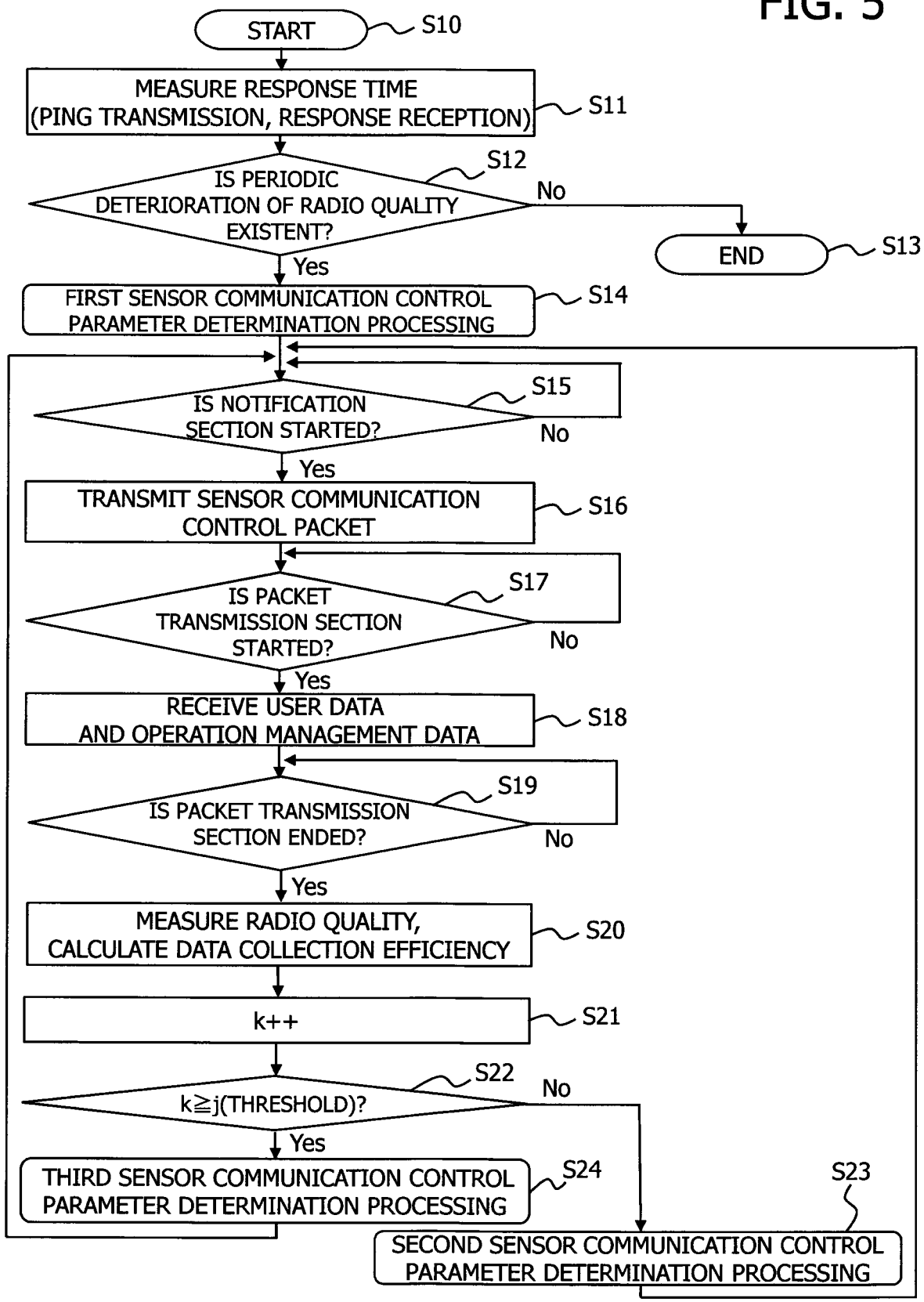
FIG. 5 is a flowchart illustrating an operation example of a data collection terminal apparatus.

FIG. 5 is a flowchart illustrating an operation example on the terminal 100 side.

On starting processing (S10), the terminal 100 measures a response time (S11).

Figure 6A:
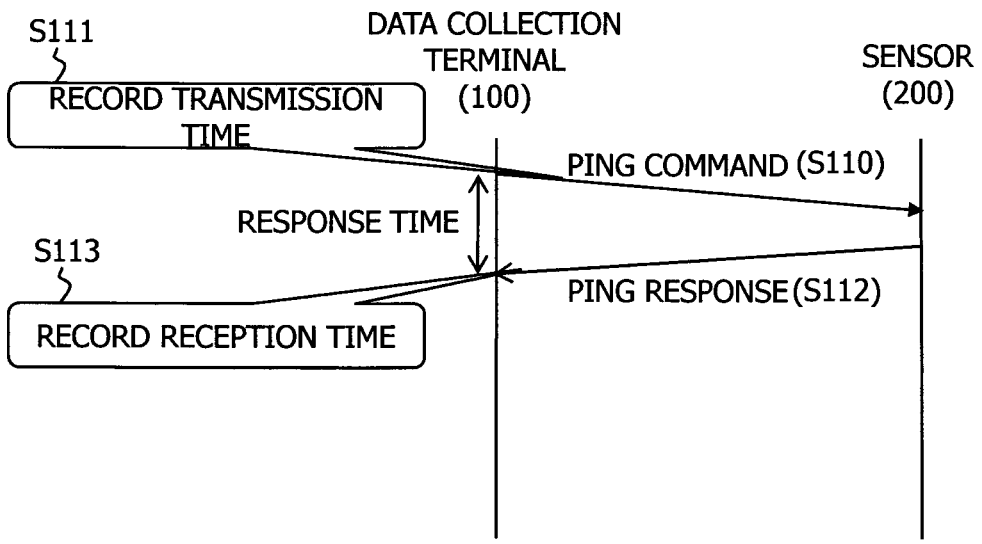
FIGS. 6A and 6B are diagrams illustrating an example of response time measurement, and an example of a detection method of periodic deterioration in radio quality, respectively.

FIG. 6A is a diagram illustrating an example of the measurement of the response time. The terminal 100 transmits to the sensor 200 a packet that includes a ping command (S110). The ping command is, for example, one of commands for response time measurement. The packet that includes the ping command becomes a response time measurement packet, for example.

At this time, the terminal 100 records the transmission time of a packet that includes the ping command (S111). The terminal 100 executes the following processing, for example.

Namely, the deteriorative section detection unit 105 outputs a ping command transmission instruction to the control parameter calculation unit 108. On receiving the above instruction, the control parameter calculation unit 108 instructs the radio transmission unit 109 to transmit the ping command. The radio transmission unit 109, on receiving the above instruction, generates a packet including the ping command, to transmit to the sensor 200. On transmitting the packet including the ping command, the radio transmission unit 109 notifies the deteriorative section detection unit 105 of the transmission time thereof, so that the deteriorative section detection unit 105 stores the transmission time into an internal memory.

The sensor 200, on receiving the packet including the ping command, generates a ping response to the ping command to transmit a packet, including the ping response, to the terminal 100 (S112). The packet including the ping response becomes a response packet to the response time measurement packet, for example. The terminal 100, on receiving the packet including the ping response, records the reception time (S113). The terminal 100 then subtracts the transmission time (S111) from the reception time (S113) to measure a response time. The sensor 200 and the terminal 100 execute the following processing, for example.

Namely, the radio reception unit 201 in the sensor 200, when receiving the packet including the ping command, forwards a notification that the packet has been received to the radio transmission unit 206 through the parameter set unit 205. The radio transmission unit 206, on receiving the above notification, generates a packet that includes the ping response, to transmit to the terminal 100. The radio reception unit 101 in the terminal 100, on receiving the packet including the ping response, notifies the deteriorative section detection unit 105 of the reception time and to the effect that the packet has been received. The deteriorative section detection unit 105 stores the reception time into the internal memory. The deteriorative section detection unit 105 then reads out the transmission time and the reception time from the internal memory, and calculates a difference between the reception time and the transmission time to be a response time.

Referring back to FIG. 5, next, the terminal 100 discriminates whether or not a periodic deterioration of radio quality exists (S12). The detection method of the periodic deterioration is described below.

<Detection Method of Periodic Deterioration in Radio Quality>

Figure 6B:
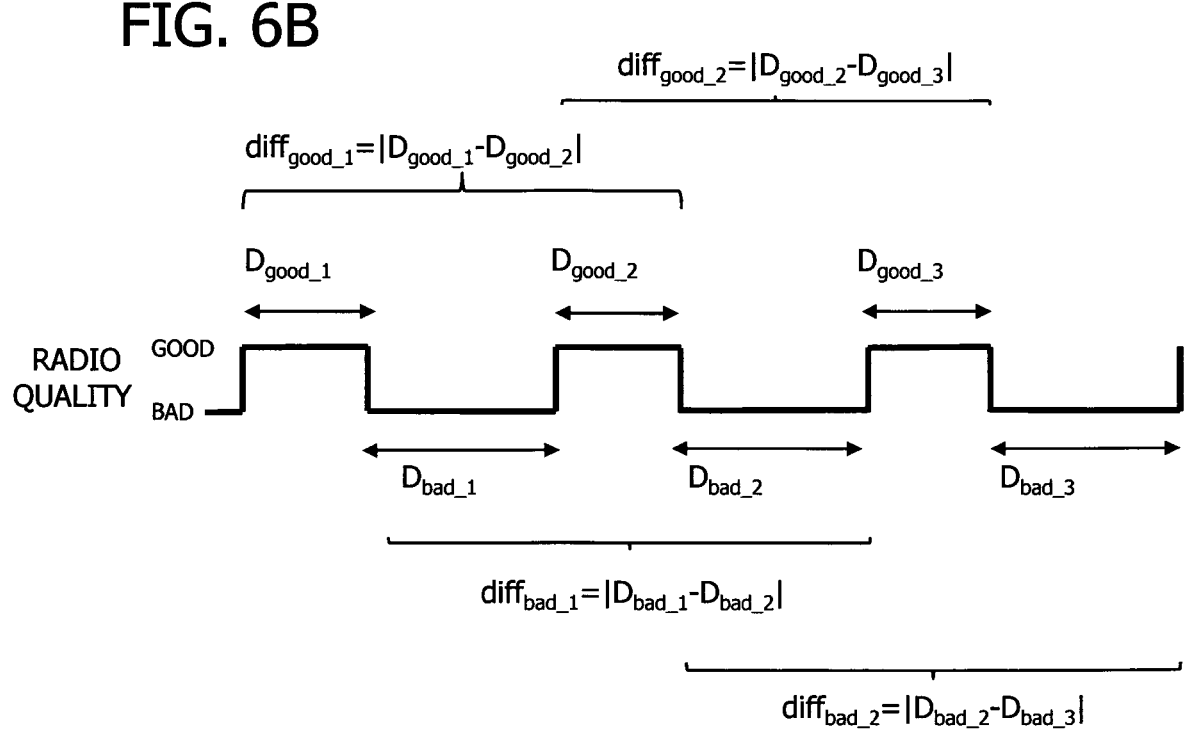

FIG. 6B is a diagram illustrating an example of the detection method of the periodic deterioration in radio quality. For example, the deteriorative section detection unit 105 performs the following processing.

Namely, the deteriorative section detection unit 105 instructs to transmit a ping command for a plurality of times, and in response thereto, receives a ping response through the radio reception unit 101 for a plurality of times. The deteriorative section detection unit 105 thus calculates the response time for the plurality of times, and compares each calculated response time with a response time threshold at each time of calculation. If the response time is equal to or less than the response time threshold, the deteriorative section detection unit 105 discriminates that the radio quality is "good" (or satisfaction), whereas if the response time is longer than the response time threshold, the deteriorative section detection unit 105 discriminates that the radio quality is "bad" (or deterioration). In other words, the deteriorative section detection unit 105 discriminates the radio quality is "satisfactory" if the response time is equal to or less than the response time threshold and as a result, no response delay occurs. On the other hand, the deteriorative section detection unit 105 discriminates the radio quality is "deteriorative" if the response time is longer than the response time threshold and as a result, a response delay occurs. The deteriorative section detection unit 105 discriminates to be "good" or "bad" for a plurality of times, according to the number of the calculated response times.

In FIG. 6B, the radio quality continues to be "good", so that the time thereof is expressed as $D_{good\_1}$. Thereafter, the radio quality becomes "bad", and continues to be "bad", so that the time thereof is expressed as $D_{bad\_1}$. Since then, the time of "good" radio quality and the time of "bad" radio quality exist alternately. The deteriorative section detection unit 105 discriminates that the periodic deterioration is existent if the following conditions are satisfied (Yes in S12).

1. For all cases of i=1, ..., M, $$diff_{good\_1} = |D_{good\_1} - D_{good\_i+1}| \leq TH \quad (1)$$

holds, and moreover,

2. For all cases of i=1, ..., M, $$diff_{bad\_1} = |D_{bad\_1} - D_{bad\_i+1}| \leq TH \quad (2)$$

holds. Equation (1) discriminates, as depicted in FIG. 6B for example, whether or not it is satisfied for all sections i=1 to M that the absolute value of a radio quality difference ($|D_{good\_1} - D_{good\_2}|$) in two consecutive sections of "good" radio quality ($D_{good\_1}$, $D_{good\_2}$) is a deteriorative section threshold TH or lower.

Also, equation (2) discriminates, for example, whether or not it is satisfied for all sections i=1 to M that the absolute value of a radio quality difference ($|D_{bad\_1} - D_{bad\_2}|$) in two consecutive sections of "bad" radio quality ($D_{bad\_1}$, $D_{bad\_2}$) is a deteriorative section threshold TH or lower.

The fact that both equation (1) and equation (2) simultaneously hold represents that each time length in which the radio quality is either "good" or "bad" ranges within the deteriorative section threshold TH, in other words, a satisfactory section and a deteriorative section are existent periodically.

Accordingly, it is possible for the deteriorative section detection unit 105 to discriminate that if equations (1) and (2) are satisfied simultaneously, the periodic deterioration exists (Yes in S12), whereas if not satisfied simultaneously, the periodic deterioration does not exist (No in S12).

Here, equations (1) and (2) are retained in the internal memory of the deteriorative section detection unit 105, so that the deteriorative section detection unit 105 appropriately reads out from the internal memory to perform discrimination in the present processing (S12). The deteriorative section detection unit 105 outputs, to the control parameter calculation unit 108, the start time and the end time of the deteriorative section and the start time and the end time of the satisfactory section.

The above is an example of the detection method of the periodic deterioration in radio quality.

Referring back to FIG. 5, on discriminating that the periodic deterioration of radio quality does not exist (No in S12), the terminal 100 completes a series of processing (S13). On the other hand, on discriminating that the periodic deterioration of radio quality exists (Yes in S12), the terminal 100 executes first determination processing of sensor communication control parameter (S14). The first determination processing of sensor communication control parameter is described below.

<First Determination Processing of Sensor Communication Control Parameter>

Figure 7:
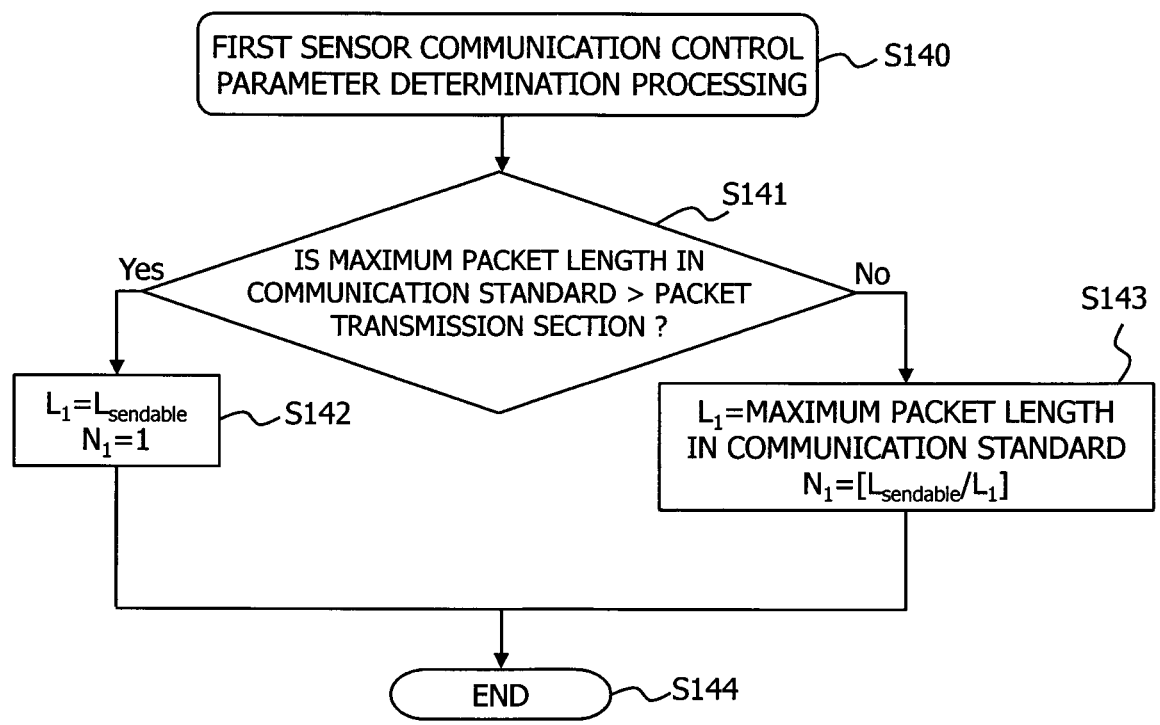
FIG. 7 is a flowchart illustrating an example of first determination processing of sensor communication control parameter.

FIG. 7 is a flowchart illustrating an example of the first determination processing of sensor communication control parameter. Here, the terminal 100 determines a packet length $L_1$ and a transmission count $N_1$ in a first packet transmission section.

The terminal 100, when starting the first determination processing of sensor communication control parameter (S140), discriminates whether or not a maximum packet length based on a communication standard is longer than the packet transmission section (S141).

Figure 8A:
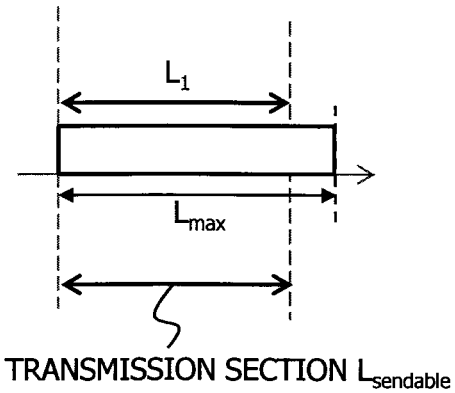
FIGS. 8A and 8B are diagrams illustrating each example of relationship between a packet transmission section and a packet maximum length based on a communication standard.
Figure 8B:
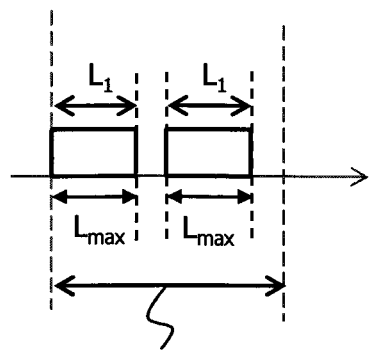

FIGS. 8A and 8B are diagrams illustrating examples of relationship between a maximum packet length $L_{max}$ based on the communication standard and a packet transmission section length $L_{sendable}$ (which may hereafter be referred to as a "packet transmission section $L_{sendable}$").

Among to be transmitted from the sensor 200 to the terminal 100, the packet having the maximum packet length $L_{max}$ based on the communication standard exists. Meanwhile, each packet transmission section $L_{sendable}$ set by the terminal 100 is finite. The first determination processing of sensor communication control parameter compares the above two sections to determine the packet length $L_1$ and the transmission count $N_1$ in the first packet transmission section.

FIG. 8A illustrates a case when the maximum packet length $L_{max}$ based on the communication standard is longer than the packet transmission section $L_{sendable}$ ($L_{max}>L_{sendable}$). In this case, a transmittable packet length $L_1$ in the packet transmission section comes to the overall length of the packet transmission section $L_{sendable}$. A transmission count $N_1$ in this case comes to "1".

In contrast, FIG. 8B illustrates a case when the maximum packet length $L_{max}$ based on the communication standard is no longer than the packet transmission section $L_{sendable}$ ($L_{max} \leq L_{sendable}$). In this case, a transmittable packet length $L_1$ in the packet transmission section is considered to be equal to the maximum packet length $L_{max}$ based on the communication standard. A transmission count $N_1$ in this case comes to $[L_{sendable}/L_1]$. That is, the transmission count $N_1$ comes to a figure obtained by rounding down below the decimal point of the divided value of the packet transmission section $L_{sendable}$ by the packet length $L_1$ (=the maximum packet length $L_{max}$ based on the communication standard). In the example of FIG. 8B, the transmission count is "2".

The terminal 100 performs, for example, the following processing. Namely, the control parameter calculation unit 108 sets the start time and the end time of the packet transmission section $L_{sendable}$, based on the start time and the end time of the satisfactory section that have been received from the deteriorative section detection unit 105.

The control parameter calculation unit 108 reads out from the internal memory the maximum packet length $L_{max}$ based on the communication standard, to compare the packet length $L_{max}$ with the packet transmission section $L_{sendable}$.

If $L_{max}>L_{sendable}$ holds (Yes in S141 of FIG. 7), the control parameter calculation unit 108 determines the packet length $L_1$ to be the packet transmission section $L_{sendable}$, and the transmission count $N_1$ to be "1".

On the other hand, in the case of $L_{max} \leq L_{sendable}$ (No in S141), the control parameter calculation unit 108 determines the packet length $L_1$ to be the maximum packet length $L_{max}$ based on the communication standard, and the transmission count $N_1$ to be $[L_{sendable}/L_1]$.

Referring back to FIG. 7, the terminal 100, on determining the packet length $L_1$ and the transmission count $N_1$ (S142, S143), completes the first determination processing of sensor communication control parameter (S144). The above is an example of the first determination processing of sensor communication control parameter.

Referring back to FIG. 5, next, the terminal 100 discriminates whether or not the notification section is started (S15), and if the notification section is not started, the terminal 100 waits until the notification section is started (No in S15). For example, the control parameter calculation unit 108 discriminates whether or not the present time indicated by a timer reaches the start time of the notification section set in S14, and if not reaching the start time, the control parameter calculation unit 108 waits until the start time.

When the notification section is started (Yes in S15), the terminal 100 transmits a sensor communication control packet (S16). For example, when the present time reaches the start time of the notification section, the control parameter calculation unit 108 outputs a sensor communication control parameter to the radio transmission unit 109 to instruct to transmit the sensor communication control packet. This causes the transmission of the sensor communication control packet from the radio transmission unit 109.

Figure 8C:
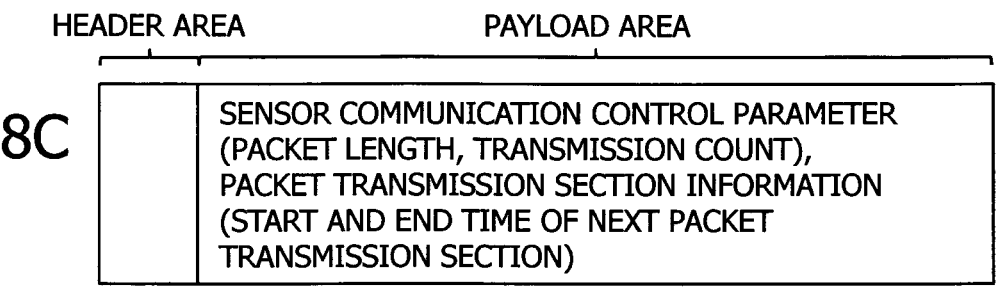
FIG. 8C is a diagram illustrating an example of a sensor communication control packet.

FIG. 8C is a diagram illustrating a configuration example of the sensor communication control packet generated in the radio transmission unit 109. The sensor communication control packet includes a header area and a payload area. In the payload area, the sensor communication control parameter, the information of packet transmission section, etc. are inserted. The radio transmission unit 109 receives the sensor communication control parameter and the packet transmission section information from the control parameter calculation unit 108 to generate the sensor communication control packet that includes the parameter and the information.

Additionally, the control parameter calculation unit 108 stores the sensor communication control parameter into the control table 107.

Referring back to FIG. 5, next, the terminal 100 discriminates whether or not the packet transmission section is started (S17), and waits until the packet transmission section is started if the packet transmission section has not been started (No in S17). For example, the control parameter calculation unit 108 discriminates whether or not the present time is the start time of the packet transmission section set in S14, and waits until the start time if the start time is not reached.

When the packet transmission section is started (Yes in S17), the terminal 100 receives user data and operation management data (S18). In the processing of S16, the terminal 100 transmits the sensor communication control packet to the sensor 200, to cause the sensor 200 to transmit an operation management packet according to the sensor communication control parameter. The terminal 100, by the reception of the operation management packet, receives the user data and the operation management data. For example, the radio reception unit 101 receives the operation management packet to output reception quality on the sensor side to the radio quality DB 104 and the user data to the user data DB 102, respectively. Also, the radio reception unit 101 notifies the data collection efficiency calculation unit 106 to the effect that the operation management packet has been received.

Next, the terminal 100 discriminates whether or not the packet transmission section is completed (S19), and waits until the completion of the packet transmission section if the packet transmission section is not completed (No in S19). For example, the control parameter calculation unit 108 discriminates whether or not the present time becomes the end time of the packet transmission section set in S14, and waits until the end time if the end time is not reached.

On completion of the packet transmission section (Yes in S19), the terminal 100 performs the measurement of radio quality and the calculation of data collection efficiency (S20). For example, when the present time reaches the end time of the packet transmission section, the control parameter calculation unit 108 sends a notification to that effect to the data collection efficiency calculation unit 106. For example, on receipt of this notification, the data collection efficiency calculation unit 106 performs the measurement of radio quality and the calculation of data collection efficiency. Description is given below on the measurement method of the radio quality and next, the calculation method of the data collection efficiency.

<Radio Quality Measurement Method>

Figure 9A:
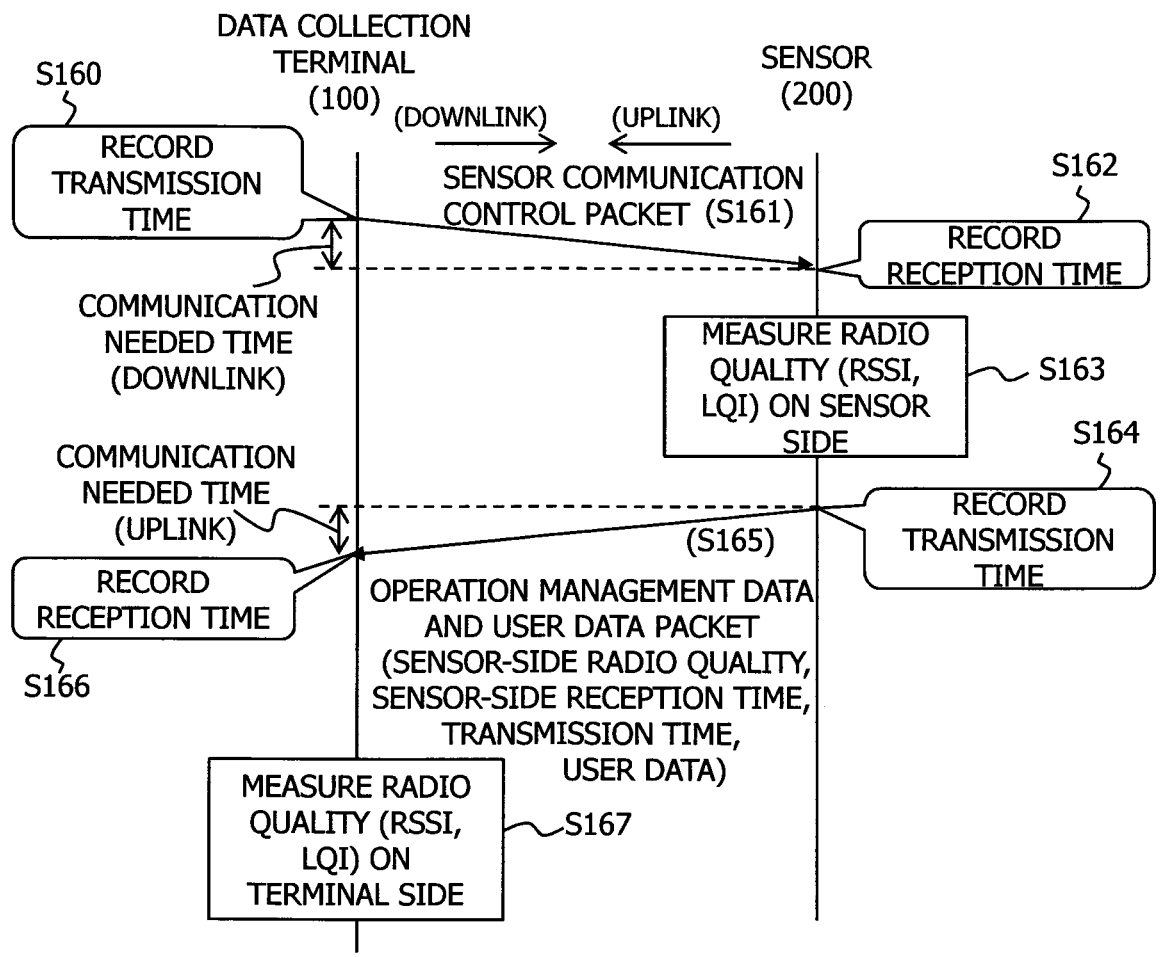
FIGS. 9A and 9B are diagrams illustrating an example of radio quality measurement, and an example of the calculation of data collection efficiency, respectively.

FIG. 9A is a diagram illustrating an example of a radio quality measurement method. The radio quality includes sensor side radio quality and terminal side radio quality.

The sensor 200 measures the sensor side radio quality in the following manner, for example. Namely, the sensor 200 measures RSSI and LQI on the sensor side, based on the sensor communication control packet received from the terminal 100 (S163). For example, the radio quality measurement unit 202 measures the reception power of the sensor communication control packet received by the radio reception unit 201, so as to measure RSSI and LQI.

The sensor 200 then generates an operation management packet that includes the measured RSSI and LQI, and transmits the generated operation management packet to the terminal 100 (S165). For example, the radio quality measurement unit 202 stores the measured RSSI and LQI into the buffer 204, so that the radio transmission unit 206 reads out the RSSI and the LQI from the buffer 204 to generate an operation management packet inclusive thereof to transmit to the terminal 100. This enables the terminal 100 to acquire the RSSI and the LQI on the sensor 200 side.

On the other hand, the terminal 100 measures terminal side radio quality in the following manner, for example. Namely, based on the operation management packet received from the sensor 200 (S165), the terminal 100 measures RSSI and LQI on the terminal side (S167). For example, the data collection efficiency calculation unit 106 measures RSSI (hereafter the RSSI on the terminal side may be referred to as "RSSI'") and LQI (hereafter the LQI on the terminal side may be referred to as "LQI'") at the time when the radio reception unit 101 receives the operation management packet.

Also, the terminal 100 measures a response time RT as one item of radio quality. As depicted in FIG. 9A, the response time RT is an added time of a time needed for communication in the downlink direction (communication direction from the terminal 100 to the sensor 200) to a time having been needed for communication in the uplink direction (communication direction from the sensor 200 to the terminal 100).

Namely, the terminal 100 records the transmission time of the sensor communication control packet (S160), whereas the sensor 200 records the reception time of the sensor communication control packet (S162). The above reception time is transmitted from the sensor 200 to the terminal 100 through the operation management packet (S165). Therefore, the terminal 100, by subtracting the transmission time from the reception time, acquires a time having been needed for communication in the downlink direction.

The terminal 100 and the sensor 200 perform the following processing, for example. Namely, the radio transmission unit 109 of the terminal 100 records the transmission time when transmitting the sensor communication control packet, and outputs the transmission time to the data collection efficiency calculation unit 106. Also, the radio reception unit 201 of the sensor 200 records the reception time when receiving the sensor communication control packet, and outputs the reception time through the radio quality measurement unit 202 to the buffer 204. The radio transmission unit 206 reads out the reception time from the buffer 204, and outputs to the terminal 100 the operation management packet by including the reception time therein. The radio reception unit 101 of the terminal 100 outputs, to the data collection efficiency calculation unit 106, the reception time of the sensor communication control packet included in the operation management packet. The data collection efficiency calculation unit 106 subtracts the reception time from the transmission time that has been received from the radio transmission unit 109, to thereby acquire the time having been needed for communication in the downlink direction.

On the other hand, at the transmission of the operation management packet, the sensor 200 records the transmission time of the operation management packet (S164), and transmits the operation management packet by including the transmission time therein (S165). The terminal 100, on receiving the operation management packet, records the reception time (S166). Therefore, the terminal 100 subtracts the transmission time of the operation management packet, which is included in the operation management packet, from the reception time of the operation management packet to thereby calculate a time having been needed for communication in the uplink direction.

The terminal 100 and the sensor 200 perform the following processing, for example. Namely, at the transmission of the operation management packet, the radio transmission unit 206 of the sensor 200 records the transmission time, and inserts the transmission time into the operation management packet to transmit. This operation management packet is received by the radio reception unit 101 of the terminal 100. The radio reception unit 101 extracts the transmission time from the operation management packet, and outputs the transmission time to the data collection efficiency calculation unit 106. Also, at the reception of the operation management packet, the radio reception unit 101 of the terminal 100 records the reception time, and outputs the reception time to the data collection efficiency calculation unit 106.

The data collection efficiency calculation unit 106 subtracts from the reception time the transmission time received from the radio reception unit 101 to calculate the time having been needed in the uplink direction.

The terminal 100 then adds the needed communication time in the downlink direction to the needed communication time in the uplink direction to calculate a response time RT. For example, the data collection efficiency calculation unit 106 adds the needed communication time in the downlink direction to the needed communication time in the uplink direction to calculate the response time RT.

The above is the example of the radio quality measurement method. Next, an example of the calculation method of data collection efficiency is described below.

<Calculation of Data Collection Efficiency>

Figure 9B:
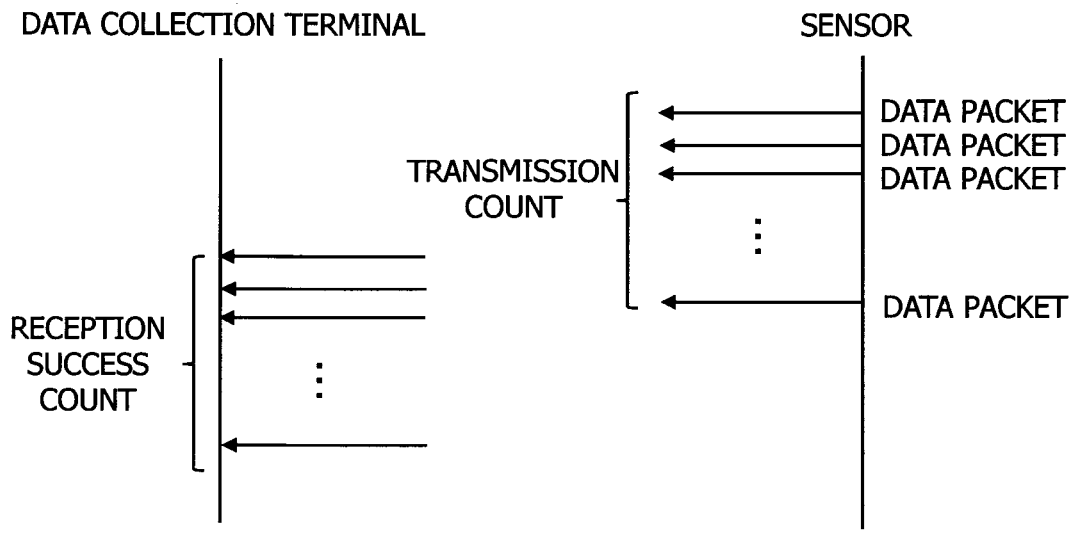

FIG. 9B is a diagram illustrating an example of the calculation of data collection efficiency. The terminal 100 calculates the data collection efficiency using the following equation, for example.

$$\text{Data collection efficiency}=(\text{reception packet length}-\text{overhead length})\times\text{reception success count}/\text{transmission count} \quad (3)$$

In a packet exchanged between the terminal 100 and the sensor 200, there are included a payload area that includes data and a header area other than the data, as depicted in FIG. 8C for example. The overhead length in equation (3) represents the length of the header area depicted in FIG. 8C. Therefore, (reception packet length−overhead length) represents the length of the payload area (or the data area) of FIG. 8C, that is, the length of data in one packet, for example. By the multiplication of the above length by (reception success count/transmission count), equation (3) represents, for example, reception data amount/transmission data amount, that is, a ratio of a packet data amount received in the terminal 100 to a packet data amount transmitted from the sensor 200.

The terminal 100 performs the following processing, for example. Namely, the data collection efficiency calculation unit 106 acquires the "transmission count" in equation (3) from the control table 107, because the transmission count calculated by the control parameter calculation unit 108 is stored in the control table 107. Also, the radio reception unit 101, whenever receiving the operation management packet transmitted from the sensor 200, notifies the control parameter calculation unit 108 of the reception. Therefore, the data collection efficiency calculation unit 106 counts the number of notifications received from the radio reception unit 101 to acquire the "reception success count" of equation (3). The control parameter calculation unit 108 then reads out equation (3) stored in the internal memory, and substitutes the respective counts into the "transmission count" and the "reception success count", so that can acquire data collection efficiency. In this case, (reception packet length−overhead length) may be stored, as a fixed value, in the internal memory together with equation (3).

In the above-mentioned manner, the terminal 100 measures the radio quality and calculates the data collection efficiency. As depicted in FIG. 5, the radio quality measurement and the calculation of the data collection efficiency are executed for each packet transmission section (or each time the packet transmission section is ended).

Next, the terminal 100 increments k of the k-th packet transmission section (k is an integer that satisfies 1≤k≤j) (S21). For example, the control parameter calculation unit 108 and the data collection efficiency calculation unit 106 manage k, so as to increment k.

Next, the terminal 100 discriminates whether or not k is a packet transmission section threshold j or larger (S22). If k is smaller than the packet transmission section threshold j (No in S22), the terminal 100 performs second determination processing of sensor communication control parameter (S23). The terminal 100 performs the second determination processing of sensor communication control parameter (S23) for k of the k-th packet transmission section from "2" (=the second packet transmission section) to "j−1" (=the (j−1)th packet transmission section). The second determination processing of sensor communication control parameter is described below.

<Second Determination Processing of Sensor Communication Control Parameter>

Figure 10:
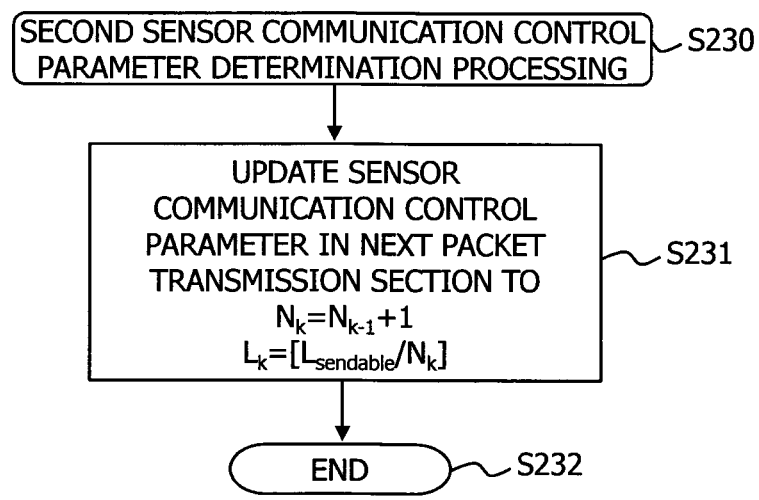
FIG. 10 is a flowchart illustrating an example of second determination processing of sensor communication control parameter.

FIG. 10 is a flowchart illustrating the second determination processing of sensor communication control parameter.

The terminal 100, on starting the second determination processing of sensor communication control parameter (S230), updates a sensor communication control parameter in the next packet transmission section to the followings (S231).

$$\text{Transmission count } N_k = N_{k-1}+1 \quad (4)$$

$$\text{Packet length } L_k = [L_{sendable}/N_k] \quad (5)$$

As indicated in equation (4), a transmission count $N_k$ of each packet transmission section from the second packet transmission section to the k-th packet transmission section (2≤k≤j−1) equals a value obtained by adding "1" to a transmission count $N_{k-1}$ of the previous packet transmission section (k−1 (=j−2)). For example, the transmission count $N_2$ of the second packet transmission section equals a value obtained by adding "1" to the transmission count $N_1$ (the transmission count determined in S14) of the first packet transmission section, and the transmission count $N_3$ of the third packet transmission section equals a value obtained by adding "1" to the transmission count $N_2$ of the second packet transmission section. The transmission count $N_k$ is incremented by "1" whenever the packet transmission section proceeds to the next.

The aim of incrementing the packet transmission count $N_k$ by "1" in such a manner is to verify at the terminal 100 how the data collection efficiency (S20) changes if the packet transmission count is incremented by 1 whenever the packet transmission section proceeds to the next.

Meanwhile, a packet length $L_k$ is an integer value obtained by rounding down below a decimal point of a value obtained by dividing the packet transmission section length $L_{sendable}$ by the transmission count $N_k$.

For example, the control parameter calculation unit 108 reads out equations (4) and (5) from the internal memory, and substitutes the transmission count $N_{k-1}$ calculated for the previous packet transmission section into equation (4) to calculate the transmission count $N_k$, and next, substitutes the transmission count $N_k$ to equation (5), so as to obtain the packet length $L_k$.

Then, the terminal 100 completes the second determination processing of sensor communication control parameter (S232). The above is an example of the second determination processing of sensor communication control parameter.

Referring back to FIG. 5, next, the terminal 100 proceeds to S15 to repeat the above-mentioned processing. Namely, as depicted in FIG. 4 for example, for the packet transmission sections k from "2" to "j−1", the terminal 100 calculates radio quality and data collection efficiency in each packet transmission section, based on the operation management packet (S20).

FIG. 12 is a diagram illustrating an example of the control table 107 when the packet transmission section k is "j−1". In the control table 107, there are stored "RSSI" and "LQI" which are radio quality on the sensor side, "RT" which represents response time, "RSSI" and "LQI" which are radio quality on the terminal side, "transmission count" and "data collection efficiency", based on each packet transmission section.

The sensor side "RSSI" and "LQI" are indicators measured by the radio quality measurement unit 202 on the sensor side, transmitted from the sensor 200 through the radio reception unit 101 and the radio quality DB 104 of the terminal 100, and then stored into the control table 107. Also, the terminal side "RSSI" and "LQI" are indicators calculated in the data collection efficiency calculation unit 106 and then stored into the control table 107.

The terminal 100, on completion of storing into the control table 107 as depicted in FIG. 12, increments the packet transmission section k (S21 in FIG. 5), to discriminate whether or not k is larger than and including the packet transmission section threshold j (S22).

If the packet transmission section k is larger than and including the packet transmission section threshold j (Yes in S22), the terminal 100 performs third determination processing of sensor communication control parameter (S24). The third determination processing of sensor communication control parameter is described below.

<Third Determination Processing of Sensor Communication Control Parameter>

Figure 11:
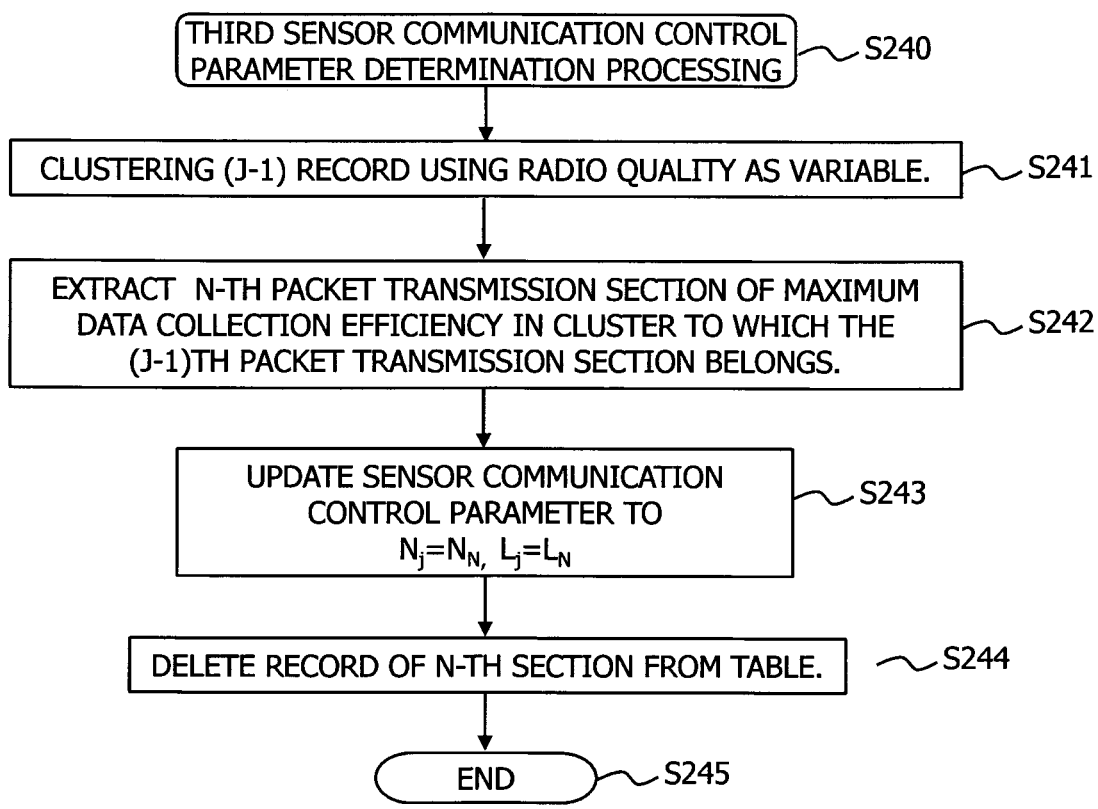
FIG. 11 is a flowchart illustrating an example of third determination processing of sensor communication control parameter.

FIG. 11 is a flowchart illustrating the third determination processing of sensor communication control parameter.

The terminal 100, on starting the third determination processing of sensor communication control parameter (S240), clusters (j−1) records that are stored in the control table 107, using radio quality as a variable (S241). For example, the control parameter calculation unit 108 clusters each packet transmission section based on the radio quality of "RSSI", "LQI", "RT", "RSSI" and "LQI" that are stored in the control table 107.

FIG. 13 is a diagram illustrating an example of the control table 107 including cluster information. For example, the radio quality of a packet transmission section belonging to a cluster "A" lies within a certain constant range, and the radio quality of a packet transmission section belonging to a cluster "B" also lies within a certain constant range. However, the radio quality of the packet transmission section belonging to the cluster "A" and the radio quality of the packet transmission section belonging to the cluster "B" are outside a constant range.

As a typical method for clustering, a well-known method, including an X-means method, a k-means method or the like, as an example thereof, may be applicable. For example, it is known that, according to the k-means method, clustering is performed by randomly allocating each cluster for the radio quality of each packet transmission section, so that a center V of each cluster is calculated to obtain a distance between each radio quality and the center V.

For example, based on radio quality, the control parameter calculation unit 108 clusters each record existent in each packet transmission section, so as to store the result thereof into each "cluster".

Referring back to FIG. 11, next, the terminal 100 extracts the N-th (N is an integer satisfying 1≤N≤j−1) packet transmission section that produces maximum data collection efficiency from a cluster to which a packet transmission section belongs (S242).

In the example of FIG. 13, for example, the control parameter calculation unit 108 verifies a cluster to which the (j−1)th packet transmission section, which is a transmission section one section before the present packet transmission section "j", belongs. The reason that the control parameter calculation unit 108 verifies the (j−1)th packet transmission section, which is a transmission section one section before the present packet transmission section, is that the radio quality thereof is the closest to the radio quality of the j-th packet transmission section. In other words, it can be assumed that, in comparison with the radio quality of other packet transmission sections, the radio quality of the (j−1)th packet transmission section is the closest to the radio quality of the j-th packet transmission section. In the example of FIG. 13, a cluster to which the (j−1)th packet transmission section belongs is a cluster "B", and therefore, the control parameter calculation unit 108 verifies the cluster "B".

The control parameter calculation unit 108 then extracts the N-th packet transmission section that produces maximum data collection efficiency in a record to which the identical cluster "B" belongs. In the example of FIG. 13, it is indicated that, among each packet transmission section belonging to the cluster "B", the data collection efficiency $\eta_N$ of the N-th packet transmission section is the best reception efficiency than any other packet transmission section belonging to the cluster "B".

Referring back to FIG. 11, next, the terminal 100 updates the sensor communication control parameter to a transmission count $N_N$ and a packet length $L_N$ in the extracted N-th packet transmission section (S243). For example, the control parameter calculation unit 108 updates to the transmission count $N_j=N_N$ and the packet length $L_j=L_N$. The transmission count $N_j$ and the packet length $L_j$ in the j-th packet transmission section come to the transmission count $N_N$ and the packet length $L_N$ having the best data collection efficiency among clusters to which the packet transmission section immediately before belongs. FIG. 13 illustrates an example of the packet control parameter after the update.

Referring back to FIG. 11, next, the terminal 100 deletes the record of the N-th section from the control table 107 (S244).

FIG. 14 is a diagram illustrating an example of the control table 107 after the record of the N-th section is deleted. For example, the control parameter calculation unit 108 deletes from the control table 107 the record of the N-th section extracted in S242.

Referring back to FIG. 11, the terminal 100 then completes the third determination processing of sensor communication control parameter (S245). The above is the example of the third determination processing of sensor communication control parameter.

Referring back to FIG. 5, the terminal 100, on completion of the third determination processing of sensor communication control parameter (S24), proceeds to S15 to repeat the above-mentioned processing. In this case, in the processing of step 16, the terminal 100 transmits to the sensor 200 the sensor communication control parameter determined in the third determination processing of sensor communication control parameter.

Thereafter, the sensor 200 comes to transmit each data packet according to the notified transmission count $N_j$ ($=N_N$) and the packet length $L_j$ ($=L_N$), for example. Thereafter, for example, when the terminal 100 detects the omission of data packet, the processing may be started from S10, so that the above-mentioned processing may be performed.

<2. Operation Example on the Sensor Side>

Figure 15:
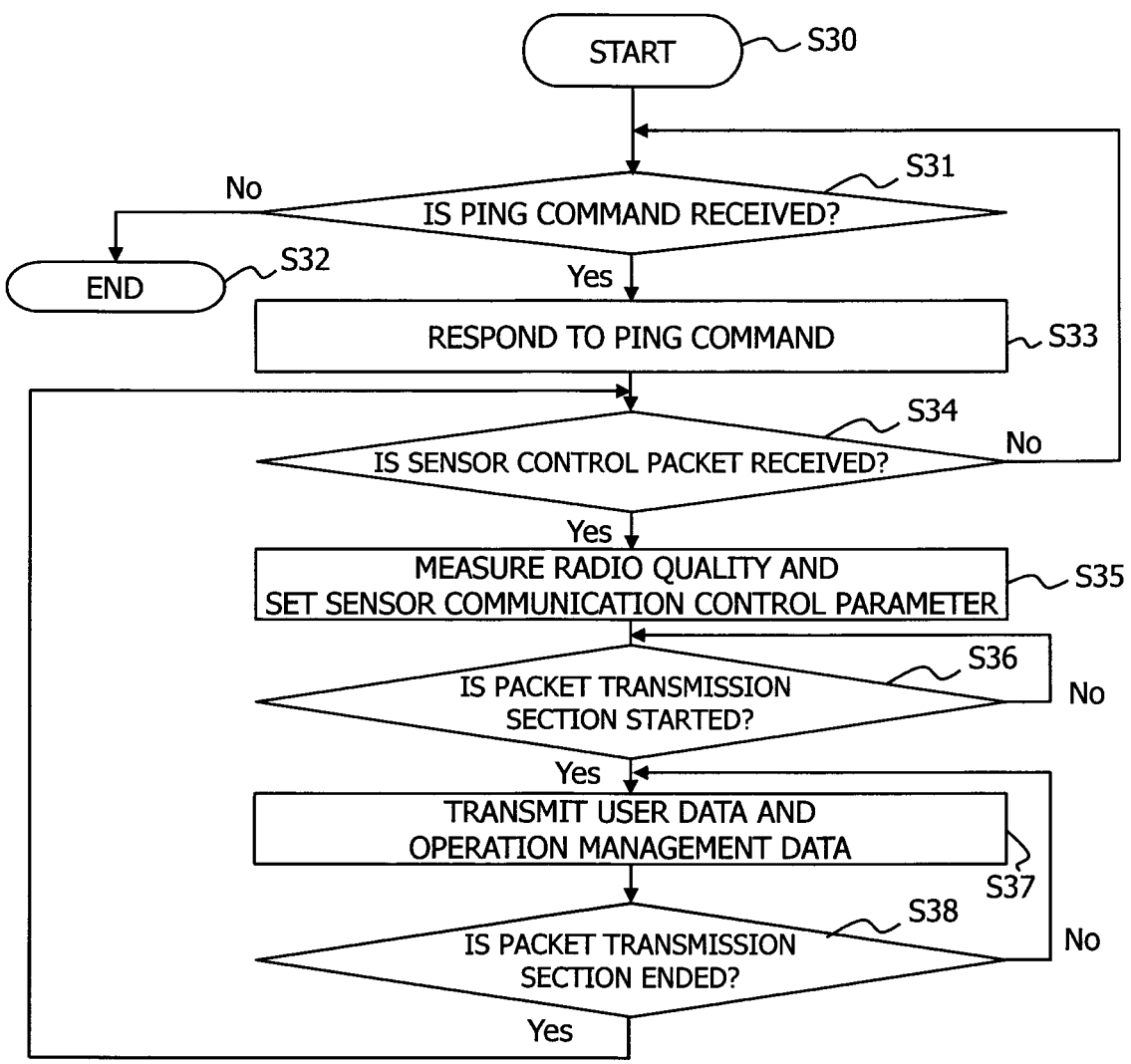
FIG. 15 is a flowchart illustrating an operation example of a sensor apparatus.

FIG. 15 is a flowchart illustrating an operation example on the sensor side.

The sensor 200, on starting processing (S30), discriminates whether or not a ping command has been received (S31). For example, the radio reception unit 201 discriminates whether or not a packet including the ping command has been received.

If no ping command is received (No in S31), the sensor 200 completes a series of processing (S32).

On the other hand, the sensor 200, on receiving the ping command (Yes in S31), responds to the ping command (S33). For example, the radio reception unit 201, when receiving a packet including the ping command, outputs a packet transmission instruction, including a ping response, through the parameter set unit 205 to the radio transmission unit 206. According to the transmission instruction, the radio transmission unit 206 generates a packet including the ping command to transmit to the terminal 100.

Next, the sensor 200 discriminates whether or not a sensor communication control packet has been received (S34), and if no sensor communication control packet is received (No in S34), the sensor 200 proceeds to S31 to repeat the above-mentioned processing.

On the other hand, the sensor 200, when receiving the sensor communication control packet (Yes in S34), measures radio quality and sets a sensor communication control parameter (S35).

For example, the parameter set unit 205 sets the radio transmission unit 206 so that packet transmission is performed according to the sensor communication control parameter. Also, the radio quality measurement unit 202 measures RSSI and LQI based on the sensor communication control packet received in the radio reception unit 201, for example.

Next, the sensor 200 discriminates whether or not a packet transmission section is started (S36). For example, the radio transmission unit 206 performs the discrimination by whether or not the present time acquired from a timer reaches the start time of the packet transmission section indicated by the sensor communication control parameter.

The sensor 200 waits until the packet transmission section is started (No in S36), and when the packet transmission section is started (Yes in S36), transmits user data and operation management data (S37). For example, at the start time of the packet transmission section, the radio transmission unit 206 reads out the user data and the operation management data from the buffer 204, and generates an operation management packet inclusive thereof to transmit to the terminal 100.

Next, the sensor 200 discriminates whether or not the packet transmission section is ended (S38), and if the packet transmission section is not ended yet (No in S38), the sensor 200 proceeds to S37 to repeat the above-mentioned processing.

On the other hand, when the packet transmission section is ended (Yes in S38), the sensor 200 proceeds to S34 to repeat the above-mentioned processing. For example, the radio reception unit 201 and the radio transmission unit 206, when discriminating that the present time is not yet the end time of the packet transmission section, proceeds to S37, whereas when discriminating the present time reaches the end time, proceeds to S34 to repeat the above-mentioned processing.

As having been described above, the terminal 100 clusters the record of the control table 107 based on the radio quality, to extract the record of the N-th packet transmission section that produces the maximum data collection efficiency in the cluster to which the packet transmission section belongs (for example, S241 to S242 in FIG. 11). The terminal 100 then transmits to the sensor 200 the transmission count $N_N$ and the packet length $L_N$ in the extracted N-th packet transmission section (for example, S16 in FIG. 5), so that the terminal 100 transmits, in the j-th packet transmission section, each packet having the packet length $L_N$ as many as the transmission count $N_N$ (for example, S35 and S37 in FIG. 15). This enables the sensor 200 to transmit to the terminal 100 each packet having the packet length that produces the best data collection efficiency for as many times as the transmission count. Thus, it is possible to prevent deteriorated throughput of the data such as user data included in the packet.

Here, even after the (j+1)th packet transmission section, the sensor 200 may transmit to the terminal 100 each data packet having the packet length $L_N$ as many as the transmission count $N_N$, for example.

In the control table 107 depicted in FIGS. 12 through 14, there has been described the example that two categories of radio quality that include the sensor side RSSI and LQI, and the terminal side RSSI' and LQI'. However, for example, there is a case that the sensor side radio quality RSSI and LQI not be stored in the control table 107. The reason is that the terminal 100 may receive the operation management packet and the data packet transmitted from the sensor 200, so that may process based on the radio quality in the uplink direction. In this case, the control parameter calculation unit 108 performs clustering using the radio quality RSSI' and LQI' that are measured in the terminal 100, without using the sensor side radio quality RSSI and LQI. Thereafter, similar to the above-mentioned example, the control parameter calculation unit 108 may select a record producing the highest data collection efficiency among records having the same cluster as the (j−1)th packet transmission section.

Second Embodiment

Next, a second embodiment will be described. In the first embodiment, the description has been given on the example when the deteriorative section does not vary. In the second embodiment, a description will be given on a case when the deteriorative section varies. Even if the deteriorative section varies, the terminal 100 can determine, corresponding to the variation thereof, a packet length $L_j$ and a transmission count $N_j$ that produce maximum data collection efficiency.

Figure 16A:
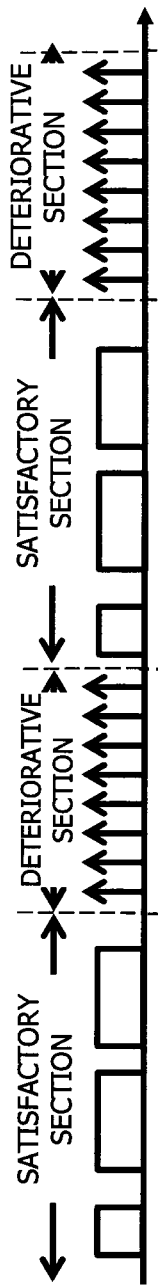
FIGS. 16A-16C are diagrams illustrating examples of a satisfactory section and a deteriorative section.
Figure 16B:
Figure 16C:
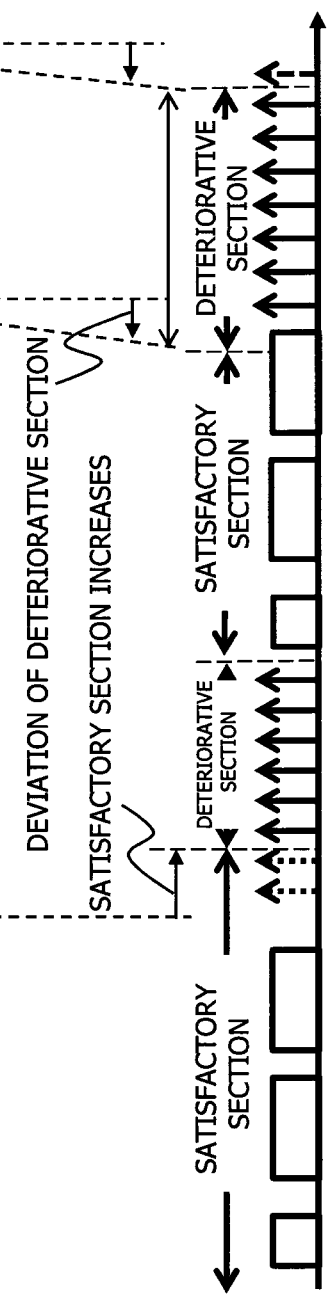

FIGS. 16A through 16C are diagrams illustrating examples of a satisfactory section and a deteriorative section.

FIG. 16A illustrates a case when the deteriorative section does not vary.

On the other hand, FIG. 16B illustrates a case when a deteriorative section disappears and wholly becomes a satisfactory section. As depicted in FIG. 16B, there are cases that the radio quality of a section, which has been a deteriorative section before, becomes satisfactory as a lapse of time, causing no response delay if the terminal 100 transmits a ping command to the sensor 200.

Or, as depicted in FIG. 16C, in some cases, a response delay is canceled in a part of deteriorative section as a lapse of time, causing that the deteriorative section is shortened. Or, there may also be cases that the deteriorative section deviates due to the occurrence of a response delay in a part of satisfactory section and the cancellation of a response delay in a part of deteriorative section as a lapse of time.

In the present second embodiment, a description is given on a case that the terminal 100 calculates a packet length in a packet transmission section and the transmission section.

Figure 17:
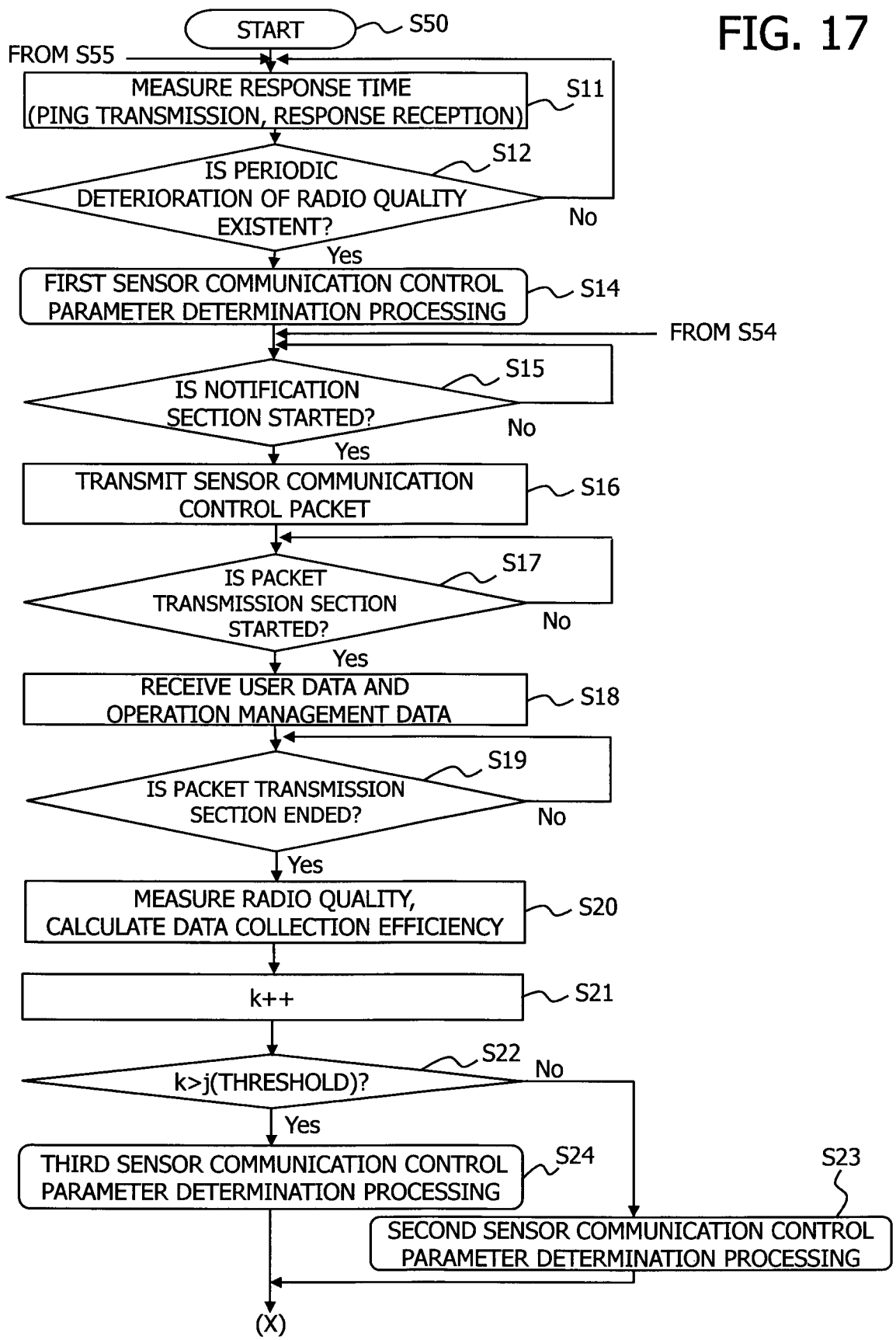
FIG. 17 is a flowchart illustrating an operation example of a data collection terminal apparatus.
Figure 18:
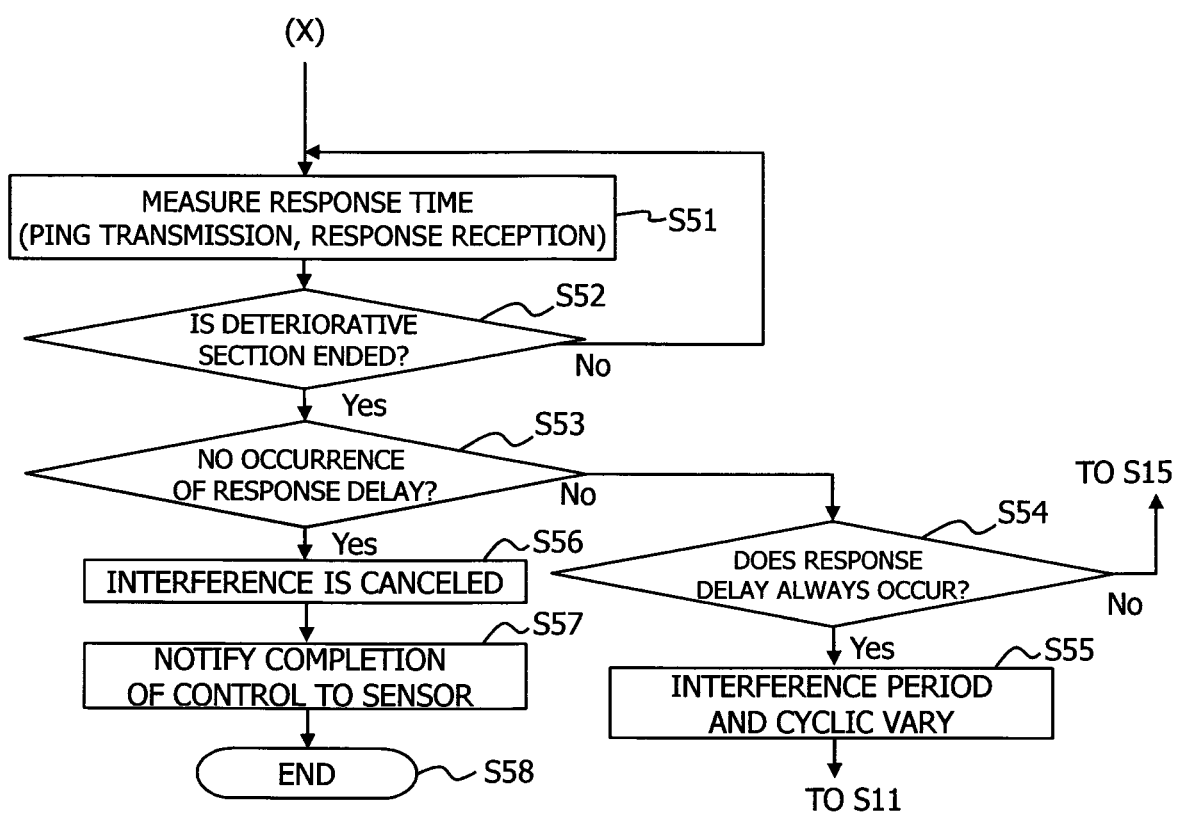
FIG. 18 is a flowchart illustrating an operation example of a data collection terminal apparatus.
Figure 19:
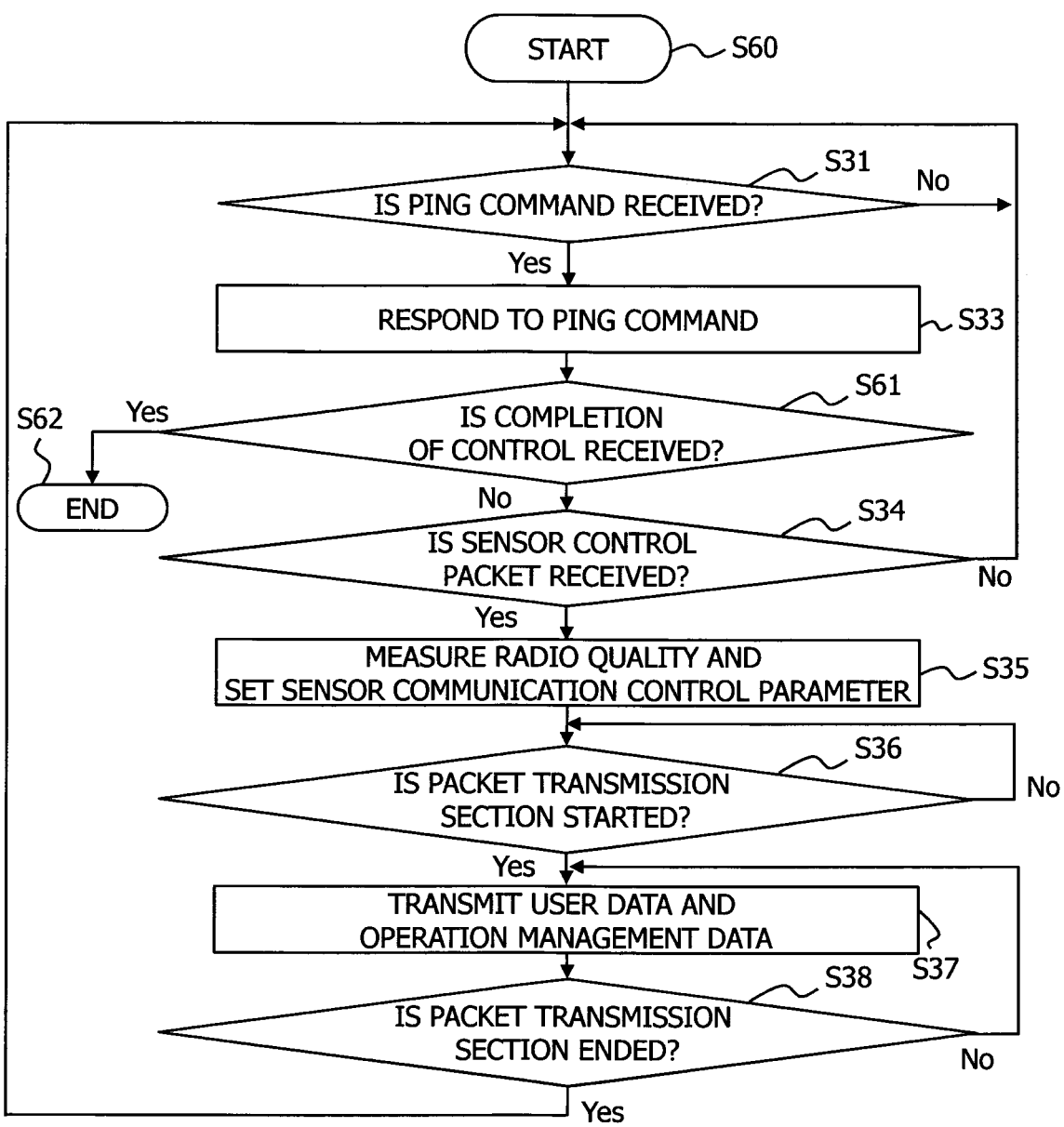
FIG. 19 is a diagram illustrating a configuration example of a sensor apparatus.

FIGS. 17 and 18 are flowcharts illustrating operation examples of the terminal 100 according to the second embodiment, and FIG. 19 is a flowchart illustrating an operation example of the sensor 200, respectively. In FIGS. 17 through 19, the same symbol is given to the same processing as in the first embodiment.

As depicted in FIG. 17, in the present second embodiment, the terminal 100, on completing the second and third determination processing of sensor communication control parameter (S23, S24), measures a response time by a ping command (S51 in FIG. 18). The measurement of the response time is the same as S11 (FIG. 17). In the deteriorative section after the completion of the second and third determination processing of sensor communication control parameter (S23, S24), the terminal 100 performs the response time measurement until the deteriorative section is end (No in S52).

When the deteriorative section is end (Yes in S52), the terminal 100 discriminates whether or not a response delay has occurred (S53). For example, the deteriorative section detection unit 105, which receives a notification from the radio reception unit 101 to the effect that a ping response has been received, counts the number of times thereof, to discriminate whether or not the count value is smaller than a response delay threshold.

On discriminating that the response delay has occurred (No in S53), the terminal 100 further discriminates whether or not the response delay occurs at all times (S54). For example, the terminal 100 performs the discrimination depending on whether or not the ratio of the occurrence of response delay to the measurement count of the response delay in the deteriorative section is a response delay ratio threshold (for example, 95% or the like) or larger.

More specifically, the terminal 100 performs the following processing, for example. Namely, when the terminal 100 transmits a ping command to the sensor 200, the deteriorative section detection unit 105 receives a notification to the effect that the ping command is transmitted from the radio transmission unit 109. The deteriorative section detection unit 105 determines the number of times of transmission in the deteriorative section to be a measurement count. The deteriorative section detection unit 105 then divides the measurement count by the number of times of reception of the ping response counted in S53, to calculate the ratio thereof, and compares the calculated ratio with the response delay ratio threshold being read out from the internal memory, so as to execute the processing of step S54.

On discriminating that the response delay occurs at all times (Yes in S54), the terminal 100 detects that the interface period and a cycle is varied (S55).

For example, if a section in which the response delay occurs at all times deviates from the deteriorative section set in S12, the deteriorative section detection unit 105 detects that the deteriorative section deviates, as depicted in FIG. 16C. Or, for example, if a section in which the response delay occurs at all times is shorter than the deteriorative section set in S12, the deteriorative section detection unit 105 detects that the deteriorative section becomes shorter, as depicted in FIG. 16C. In short, the deteriorative section detection unit 105 detects a time change in the deteriorative section, for example. On detection of the deviation or the time change of the deteriorative section, the deteriorative section detection unit 105 measures a response time again through the processing of S11, so as to determine the periodicity thereof in S12. The deteriorative section detection unit 105 notifies the control parameter calculation unit 108 of the information of the deteriorative section after the variation (and the information of the satisfactory section after the variation). This causes the transmitting the information of the deteriorative section after the variation from the terminal 100 to the sensor 200. Thereafter, the terminal 100 and the sensor 200 perform the second and third determination processing of sensor communication control parameter (S23, S24) etc. according to the deteriorative section after the variation.

Referring back to FIG. 18, on the other hand, on discriminating that the response delay does not occur at all times (No in S54), the terminal 100 proceeds to S15 of FIG. 17, to repeat the above-mentioned processing. In this case, the terminal 100 discriminates that there is no variation in the deteriorative section, so as to perform processing thereafter.

Referring back to FIG. 18, if no response delay occurs (Yes in S53), the terminal 100 discriminates that interference is canceled (S56) and notifies the sensor 200 of the completion of control (S57).

The terminal 100 performs the following processing, for example. Namely, the deteriorative section detection unit 105 discriminates that no response delay has occurred in the deteriorative section if the number of times of reception of the ping response is smaller than the response delay threshold. At this time, the deteriorative section detection unit 105 discriminates that the interference has been canceled and the deteriorative section disappears, so as to output a control completion notification to the control parameter calculation unit 108. The control parameter calculation unit 108 generates a sensor communication control parameter, including the notification of control completion, to transmit through the radio transmission unit 109 to the sensor 200. Thereafter, the radio transmission unit 109 stops the transmission of the sensor communication control packet, and also the radio reception unit 101 stops the reception of the operation management packet.

Then the terminal 100 completes a series of processing (S58).

FIG. 19 is a flowchart illustrating an operation example on the sensor 200 side according to the present second embodiment. In FIG. 19, the same symbol is given to the same processing as in the first embodiment.

The sensor 200, when receiving the control completion (Yes in S61) after responding to the ping command (S33), completes a series of processing (S62), whereas when not receiving the control completion (No in S61), performs the processing of S34 and after. For example, on receiving the sensor communication control parameter including the notification of the control completion, the radio reception unit 201 outputs control completion to the parameter set unit 205, so that the parameter set unit 205 clears the sensor communication control parameter having been set to the radio transmission unit 206.

Third Embodiment

A third embodiment will be described. The third embodiment is an example that the terminal 100, if not receiving a packet in a packet transmission section after transmitting a sensor communication control packet, increases a notification section and further divides a satisfactory section, for example.

Figure 20A:
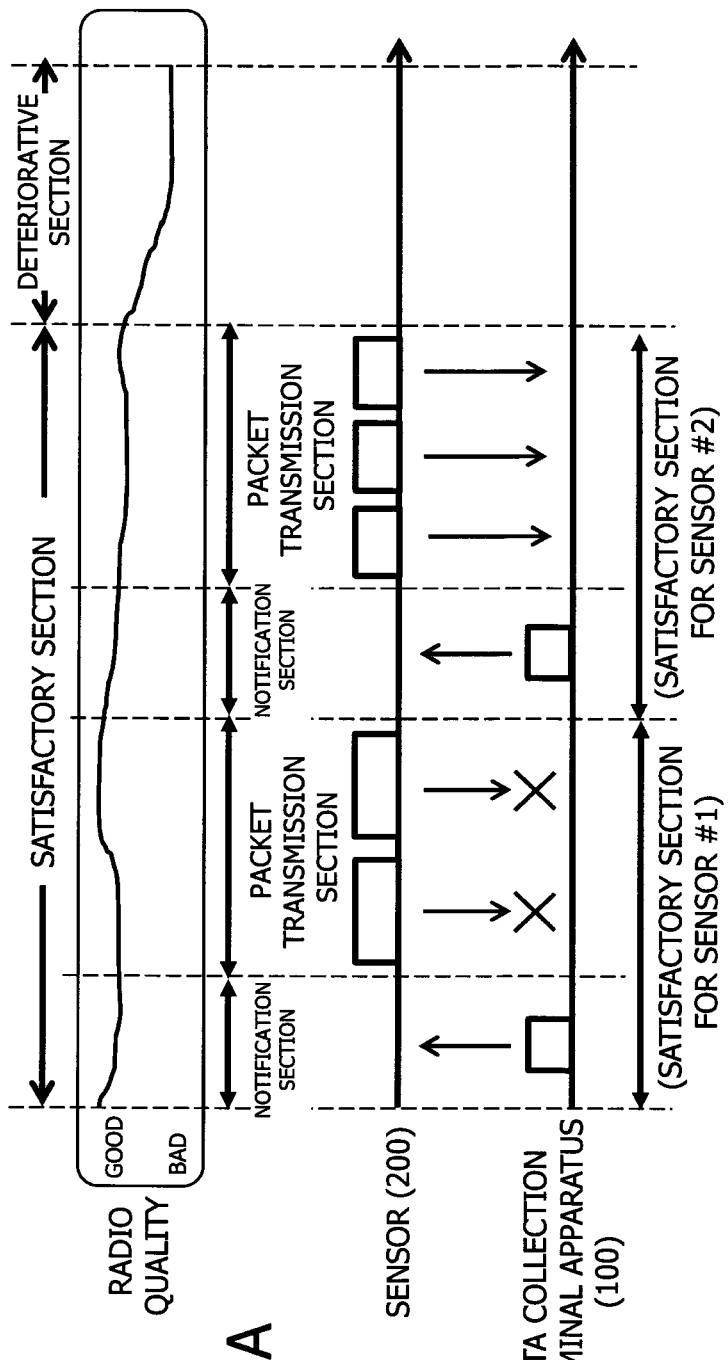
FIG. 20A is a diagram illustrating an example of a satisfactory section and a deteriorative section.

FIG. 20A is a diagram illustrating an example of a packet transmission section when the satisfactory section is divided. The terminal 100, due to a packet reception failure in the packet transmission section, divides the satisfactory section, so as to transmit the sensor communication control packet again in the notification section after the division of the satisfactory section.

The division of the satisfactory section causes an increased transmission opportunity of the sensor communication control packet in the terminal 100 in comparison with a case when the satisfactory section is not divided, and therefore, it is possible to increase the reception probability of the sensor communication control packet in the sensor 200.

The terminal 100 performs the following processing, for example. Namely, after the start of a packet transmission section (Yes in S17 of FIG. 5), if an operation management packet is not received, the radio reception unit 101 does not perform the processing of S18, and notifies the deteriorative section detection unit 105 to that effect. The deteriorative section detection unit 105, on receiving the notification, divides the satisfactory section set in S12 into two, to notify the control parameter calculation unit 108 of the information of the satisfactory section after the division. In the notification section after the division, the control parameter calculation unit 108 transmits the sensor communication control parameter through the radio transmission unit 109 to the sensor 200. Thereafter, the terminal 100 performs the processing of S19 and after.

Additionally, in the example of FIG. 20A, an example of division into two is depicted. It may be possible to divide into three or more if the satisfactory section is dividable.

Fourth Embodiment

A fourth embodiment will be described. The fourth embodiment is an example in which the transmission of a sensor communication control parameter is canceled if the sensor communication control parameter is the same parameter as transmitted last time.

Figure 20B:
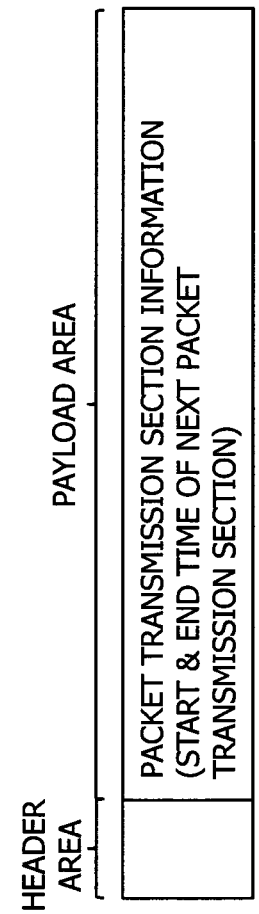
FIG. 20B is a diagram illustrating an example of a sensor communication control packet, respectively.

According to the first embodiment, the sensor communication control packet includes the sensor communication control parameter and the packet transmission section information, as depicted in FIG. 8B for example. According to the present fourth embodiment, in the sensor communication control packet, the sensor communication control parameter is not included, but the information of the packet transmission section is included, as depicted in FIG. 20B for example. As such, according to the fourth embodiment, an amount of information included in the sensor communication control packet is reduced, and therefore, the packet size of the sensor communication control packet can be reduced. The reduced packet size enables the use of a radio resource of the radio section to other radio communication, so that can contribute to effective utilization of the radio resource.

The terminal 100 performs the following processing, for example. Namely, the control parameter calculation unit 108, after transmitting a sensor communication control packet (S16 in FIG. 5), retains in the internal memory the sensor communication control parameter included in the transmitted sensor communication control packet. Next, in the notification section, the control parameter calculation unit 108 compares the calculated sensor communication control parameter with the sensor communication control parameter retained in the internal memory. If both are coincident, the control parameter calculation unit 108 is configured not to output the sensor communication control parameter to the radio transmission unit 109. In this case, the control parameter calculation unit 108 outputs the packet transmission section information to the radio transmission unit 109, so that the radio transmission unit 109 can transmit a sensor communication control packet that includes the packet transmission section information but does not include the sensor communication control parameter.

Fifth Embodiment

A fifth embodiment is an example of dividing a satisfactory section by as many as the number of units of the sensors 200.

FIG. 20A is a diagram illustrating an example of the satisfactory section and deteriorative section when the satisfactory section is divided into two in the case of two sensor units, namely, sensors 200 including a sensor (#1) 200-1 and a sensor (#2) 200-2.

The terminal 100 divides the satisfactory section to fit to the number of units of sensors 200, Then, in the allocated section thereof, the terminal 100 transmits each sensor communication control packet to the sensors 200-1, 200-2, and the sensors 200-1, 200-2 transmit each packet to the terminal 100.

This enables each sensor 200-1, 200-2 to receive the sensor communication control packet without crosstalk. Therefore, according to the fifth embodiment, it is possible to increase reception probability in the sensors 200-1, 200-2, in comparison with a case when the satisfactory section is not divided.

Also, each sensor 200-1, 200-2 can transmit a packet to the terminal 100 in each allocated section. Therefore, according to the fifth embodiment, it is possible to increase reception probability in the terminal 100, in comparison with a case when the satisfactory section is not divided.

The terminal 100 performs the following processing, for example. Namely, at the response to a ping command (S11 in FIG. 5), the radio reception unit 101 detects the number of units of sensors 200 based on the transmission source address of a packet including the ping command response, to notify the deteriorative section detection unit 105. According to the notified number of units, the deteriorative section detection unit 105 divides the satisfactory section to output to the control parameter calculation unit 108 the information of each section after the division. The control parameter calculation unit 108 outputs packet transmission section information, including the information of each section after the division, to the radio transmission unit 109, and thus, the information of each section after the division is notified to the sensor 200. This causes the terminal 100 to transmit, in each notification section, a sensor communication control packet destined to each sensor 200, and the sensor 200 transmits an operation management packet etc. to the terminal 100 in each packet transmission section.

Other Embodiments

Figure 21A:
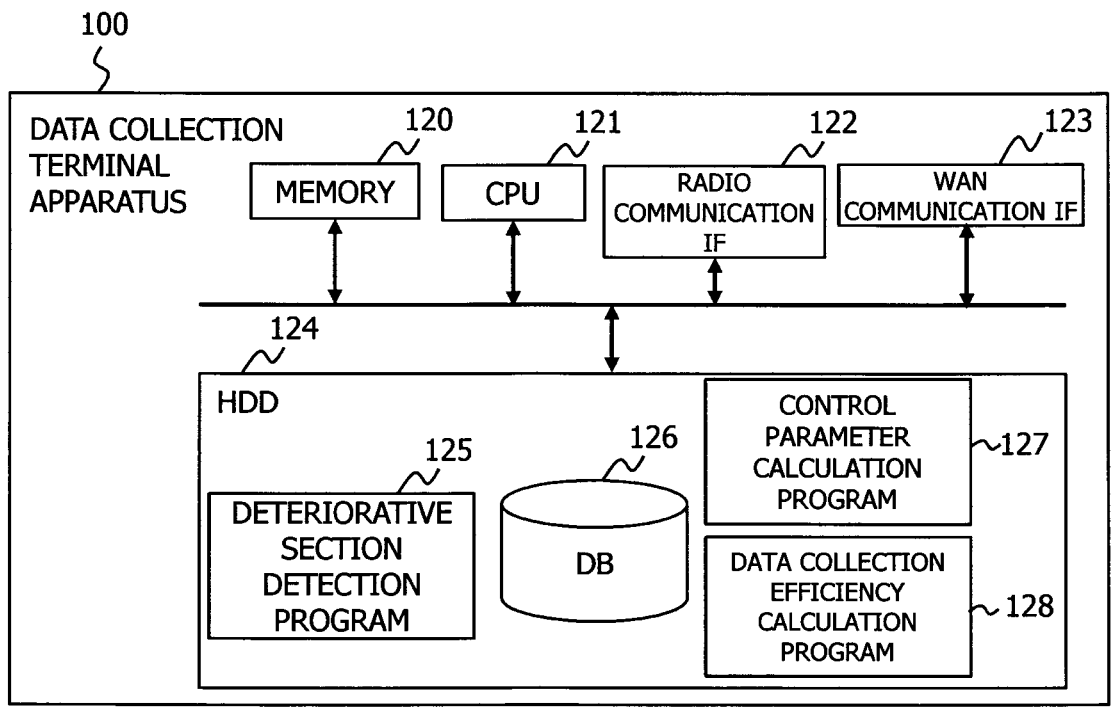
FIGS. 21A and 21B are diagrams illustrating hardware configuration examples of a data collection terminal apparatus and a sensor apparatus, respectively.
Figure 21B:
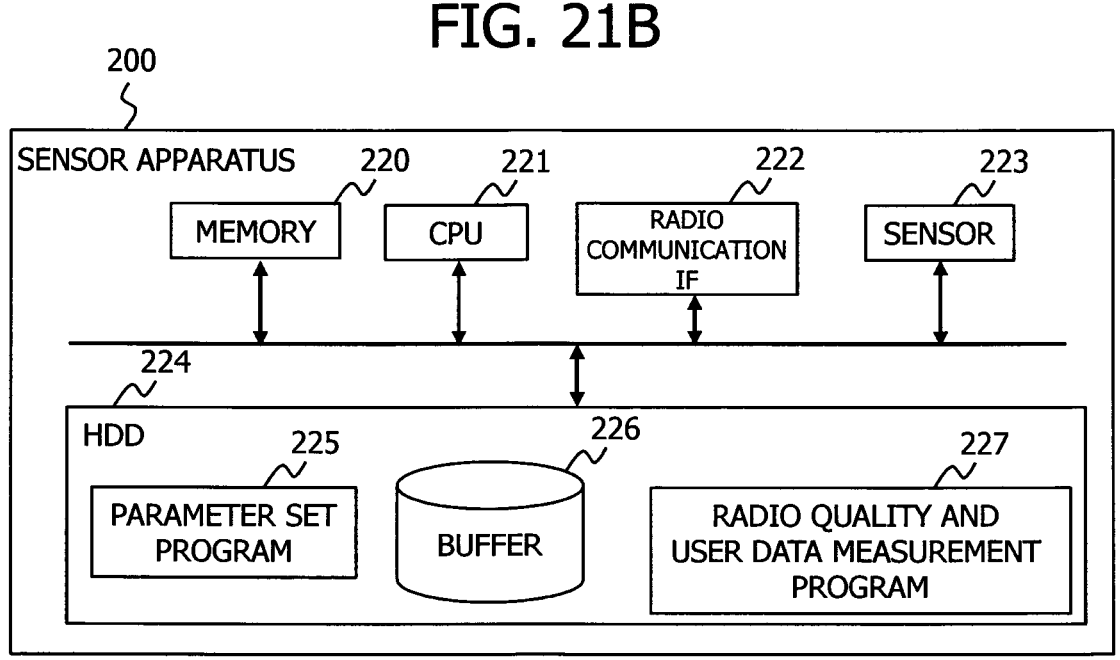

FIGS. 21A, 21B are diagrams illustrating hardware configuration examples of the terminal 100 and the sensor 200, respectively.

The terminal 100 includes a memory 120, a CPU (Central Processing Unit) 121, a radio communication IF (Interface) 122, a WAN communication IF 123 and an HDD (Hard Disk Drive) 124. The HDD 124 stores a deteriorative section detection program 125, a DB (Data Base) 126, a control parameter calculation program 127, and a data collection efficiency calculation program 128.

The CPU 121 reads out from the HDD 124 and executes the deteriorative section detection program 125, to thereby actualize the function of the deteriorative section detection unit 105. Further, the CPU 121 reads out from the HDD 124 and executes the data collection efficiency calculation program 128, to thereby actualize the function of the data collection efficiency calculation unit 106. The CPU 121 corresponds to the deteriorative section detection unit 105, the control parameter calculation unit 108 and the data collection efficiency calculation unit 106, for example.

Also, the radio communication IF 122 corresponds to the radio reception unit 101 and the radio transmission unit 109, for example. Further, the WAN communication IF 123 corresponds to the WAN side transmission unit 103, for example. Further, the DB 126 corresponds to the radio quality DB 104 and the control table 107, for example.

The sensor 200 includes a memory 220, a CPU 221, a radio communication IF 222, a sensor 223 and an HDD 224. The HDD 224 provides a parameter set program 225, a buffer 226, and a radio quality and user data measurement program 227.

The CPU 221 reads out the parameter set program 225 from the HDD 224 and executes, to thereby actualize the function of the parameter set unit 205. Also, the CPU 221 executes the radio quality and user data measurement program 227 to thereby actualize the function of the radio quality measurement unit 202. The CPU 221 corresponds to the parameter set unit 205 and the radio quality measurement unit 202, for example.

Also, the radio communication IF 222 corresponds to the radio reception unit 201 and the radio transmission unit 206, for example. Further, the sensor 223 corresponds to the user data measurement unit 203, for example. Further, the buffer 226 corresponds to the buffer 204, for example.

Here, in place of each CPU 121, 221 in FIGS. 21A, 21B, it may be possible to apply a processor or a controller including an MPU (Micro Processing Unit), a DSP (Digital Signal Processor), an FPGA (Field Programmable Gate Array), or the like.

Figure 22:
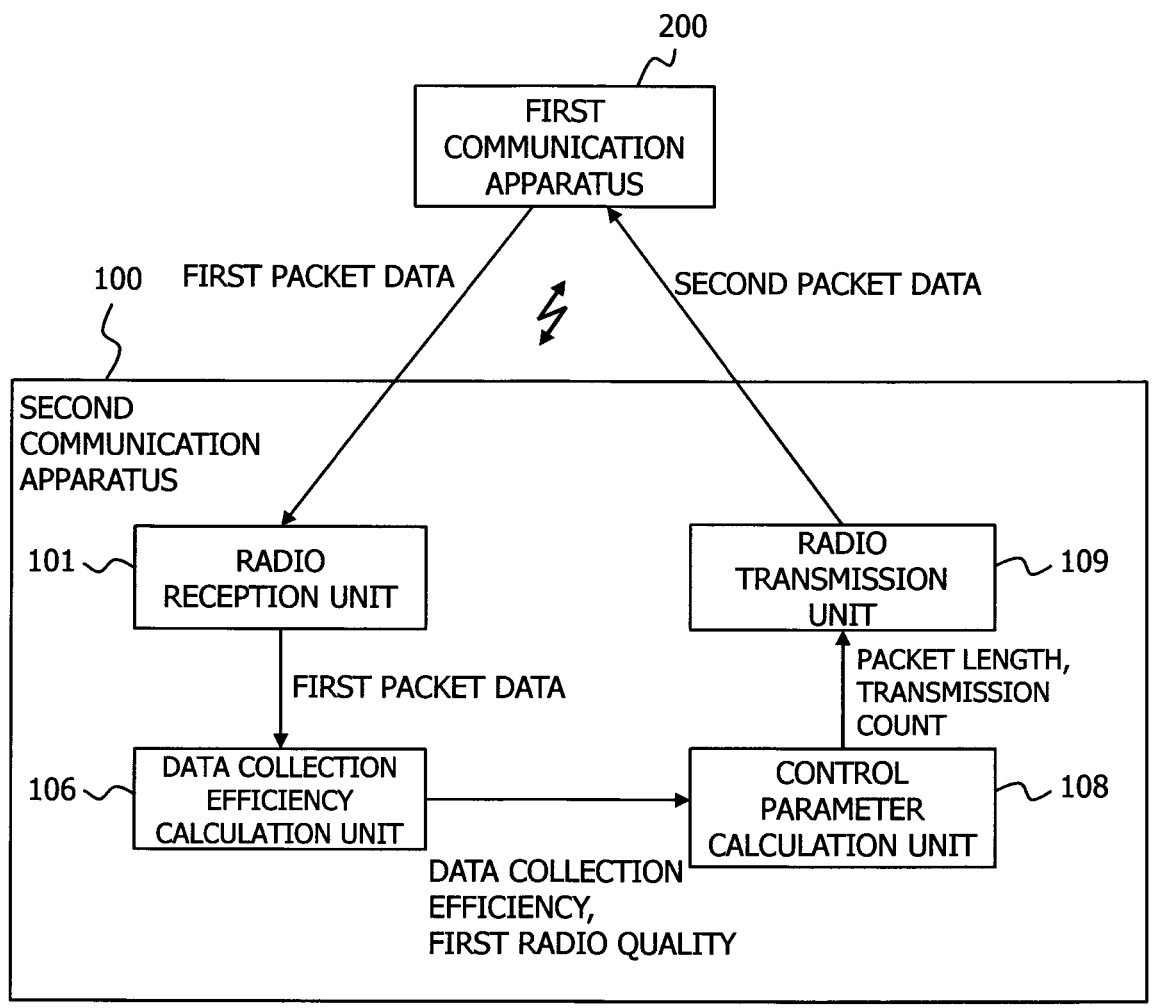
FIG. 22 is a diagram illustrating an example of a communication system.

FIG. 22 is a diagram illustrating another configuration example of the communication system 10. The communication system 10 includes the first and second communication apparatuses 200, 100. The first communication apparatus 200 is the sensor 200 of the first embodiment, for example. Also, the second communication apparatus 100 is the terminal 100 of the first embodiment, for example.

The second communication apparatus 100 includes the radio reception unit 101, the data collection efficiency calculation unit 106, the control parameter calculation unit 108, and the radio transmission unit 109.

The radio reception unit 101 receives first packet data transmitted form the first communication apparatus 200 in a first packet transmission period.

The data collection efficiency calculation unit 106 calculates data collection efficiency that indicates the ratio of the first packet data, received in the second communication apparatus, to a transmission data amount of the first packet data transmitted from the first communication apparatus 200, based on the received first packet data. Also, the data collection efficiency calculation unit 106 measures first radio quality in a radio section between the first radio communication apparatus 200 and the second communication apparatus 100, based on the received first packet data.

The control parameter calculation unit 108 calculates the packet length and the transmission count of the packet data transmitted from the first communication apparatus 200, based on the data collection efficiency and the first radio quality, the control parameter calculation unit 108 calculates the packet length and the transmission count of the packet data transmitted from the first communication apparatus 200. The packet data includes the first packet data and other packet data, for example.

The radio transmission unit 109 transmits second packet data, including the packet length and the transmission count, to the first communication apparatus 200.

As such, the second communication apparatus 100 calculates the data collection efficiency based on the first packet data received in the first packet transmission period, and measures the radio quality based on the first packet data received in the first packet transmission period. Then, the second communication apparatus 100 calculates the packet length and the transmission count of the packet data based on the data collection efficiency and the radio quality.

Accordingly, because the second communication apparatus 100 calculates the packet length and the transmission count in consideration of the radio quality in the first packet transmission period in which the packet data is transmittable, it is also possible to calculate the packet length and the transmission count when the radio quality is satisfactory. Therefore, in comparison with a case when no consideration is given on the radio quality in the first packet transmission period, the present communication system 10 can prevent the deterioration of a packet data throughput transmitted from the first communication apparatus 200.

Also, because the second communication apparatus 100 calculates the packet length and the transmission count in consideration of the data collection efficiency in the first packet transmission period, it is possible to prevent the deterioration of a packet data throughput in comparison with a case when no consideration is given on the data collection efficiency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus that transmits and receives packet data by radio communication with another communication apparatus, the communication apparatus comprising:
   a memory; and
   a processor coupled to the memory and the processor configured to:
   receive first packet data transmitted from the other communication apparatus in a first packet transmission period;
   calculate data collection efficiency indicating a ratio of a reception data amount of the first packet data received in the communication apparatus, to a transmission data amount of the first packet data transmitted from the other communication apparatus, based on received the first packet data, and measure a first radio quality, there is a response time from sending a measurement packet to receiving a response packet to the measurement packet, in a radio section between the communication apparatus and the other communication apparatus, based on received the first packet data;

calculate a packet length and transmission count of the first packet data transmitted from the other communication apparatus, based on the data collection efficiency and the first radio quality;
transmit a second packet data including the packet length and transmission count to the other communication apparatus;
measure a response time based on transmission time of a response time measurement packet transmitted from the processor and reception time of a response packet in the processor, transmitted from the other communication apparatus in response to the response time measurement packet, and detect a periodic deterioration state in the radio quality based on the response time;
receive the first packet data and transmit the second packet data, respectively, in a first period other than a period with the deterioration state;
transmit the second packet data in a notification period included in a first period other than a period with the periodic deterioration state, and
receive the first packet data in the first packet transmission period included in the first period.

2. The communication apparatus according to claim 1, wherein the processor is configured to calculate the data collection efficiency based on the transmission count of the first packet data transmitted from the other radio communication apparatus and a reception count of the first packet data, in the first packet transmission period.

3. The communication apparatus according to claim 2, wherein the processor is configured to calculate a value multiplying a ratio of the reception count to the transmission count and a length of a payload area of the first packet data, as the data collection efficiency.

4. The communication apparatus according to claim 1, wherein the processor is configured to
detect a periodic deterioration state in the radio section, based on transmission time of a response time measurement packet transmitted from the processor and reception time of a response packet in the processor, transmitted from the other communication apparatus in response to the response time measurement packet.

5. The communication apparatus according to claim 1, wherein the processor is configured to:
store the first radio quality and a second radio quality measured by the other communication apparatus in the memory,
store measured the first radio quality in the memory,
extract the second radio quality from the first packet data and store the first radio quality in the memory, and
determine the packet length and transmission count, based on the first and second radio qualities stored in the memory and the data collection efficiency.

6. The communication apparatus according to claim 1, wherein the processor is configured to determine the packet length and transmission count of the first packet data transmitted from the other communication apparatus in the first packet transmission period, based on a length of the first packet transmission period and a maximum packet length of the first packet data on communication standard.

7. The communication apparatus according to claim 6, wherein the processor is configured to set the packet length of the first packet data to the packet transmission period and the transmission count of the first packet data to "1", when the maximum packet length is longer than the first packet transmission period, and the packet length of the first packet data to the maximum packet length and the transmission count of the first packet data to an integer value obtained by rounding down below a decimal point of a value obtained by dividing the transmission count by the maximum packet length, when the maximum packet length is equal to or less than the packet transmission period.

8. The communication apparatus according to claim 6, wherein the processor is configured to set the transmission count in each packet transmission period from a second transmission period arriving next to the first packet transmission period to a (j−1)th (j is an integer of 3 or more) packet transmission period arriving sequentially after the second packet transmission period, to a first count obtained by adding the transmission count of the first packet data in a (j−2)th packet transmission period to "1", and
the packet length in the each packet transmission period to an integer value obtained by rounding down below a decimal point of a value obtained by dividing the packet transmission period by the first count.

9. The communication apparatus according to claim 8, wherein the processor is configured to calculate the data collection efficiency in the each transmission period, based on the first packet data received from the other communication apparatus in the each transmission period.

10. The communication apparatus according to claim 9, wherein the processor is configured to set the transmission count and packet length in a Nth (N is an integer satisfying 1≤N≤j−1) packet transmission period with a highest data collection efficiency out of the data collection efficiency in the packet transmission period with a radio quality within a predetermined range to the first radio quality in the (j−1)th packet transmission period, to a transmission count and packet length of the first packet data in a jth packet transmission period, respectively.

11. The communication apparatus according to claim 10, wherein the processor is configured to:
measure from the 1'th radio quality to the (j−1)th radio quality, based on the first packet data received in the each packet transmission period from the first packet transmission period to the (j−1) the packet transmission period, and
set the transmission period and packet length in the Nth packet transmission period with the highest data collection efficiency out of the data collection efficiency in a packet transmission period with a radio quality within an each predetermined range from the 1'th radio quality to a (j−1)'th radio quality, to the transmission count and packet length in the jth packet transmission period, respectively.

12. The communication apparatus according to claim 11, wherein the processor is configured to delete a radio quality in the Nth packet transmission period from the memory.

13. The communication apparatus according to claim 1, wherein the processor is configured to:
detect a periodic deterioration state in the radio section, based on transmission time of a response time measurement packet transmitted from the processor and reception time of a response packet in the processor, transmitted from the other communication apparatus in response to the response time measurement packet, and
stop reception of the first packet data and transmission of the second packet data, when the processor is configured to detect cancellation of the periodic deterioration state, and receive the first packet data and transmit the second packet data respectively in a period other than a period with the deterioration state after time change, when the processor is configured to detect the time change of the deterioration state.

14. The communication apparatus according to claim 1, wherein the processor is configured to:
detect a periodic deterioration state in the radio section, based on transmission time of a response time measurement packet transmitted from the processor and reception time of a response packet in the processor, transmitted from the other communication apparatus in response to the response time measurement packet, and set a first period other than a period with the deterioration state,
divide the first period into a second and third periods when the processor is configured not to receive the first packet data in the first packet transmission period, and
transmit the second packet data in a notification period including the third period, and the processor is configured to receive the first packet data in a packet transmission period including the third period.

15. The communication apparatus according to claim 1, wherein the processor is configured not to transmit the second packet data including the packet length and transmission count in a third packet transmission period arriving next to the second packet transmission period, when the packet length and transmission count calculated on receiving the first packet data in the first packet transmission period in the processor are the same as a packet length and transmission count calculated on receiving the first packet data in a second packet transmission period arriving next to the first packet transmission period in the processor, respectively.

16. The communication apparatus according to claim 1, wherein the processor is configured to:
detect a periodic deterioration state in the radio section, based on transmission time of a response time measurement packet transmitted from the processor and reception time of a response packet in the processor, transmitted from the other communication apparatus in response to the response time measurement packet, and set a first period other than a period with the deterioration state, and
divide the first period according to number of the other communication apparatus.

17. A communication system comprising:
a first communication apparatus; and
a second communication apparatus which transmits and receives packet data by radio communication with the first communication apparatus, wherein the second communication apparatus including a second memory; and
a second processor coupled to the second memory and the second processor configured to:
receive first packet data transmitted from the first communication apparatus in a first packet transmission period,
calculate data collection efficiency indicating a ratio of a reception data amount of the first packet data received in the second communication apparatus, to a transmission data amount of the first packet data transmitted from the first communication apparatus, based on received the first packet data, and measure a first radio quality, there is a response time from sending a measurement packet to receiving a response packet to the measurement packet, in a radio section between the first and second communication apparatuses, based on received the first packet data,
calculate a packet length and transmission count of the first packet data transmitted from the first communication apparatus, based on the data collection efficiency and the first radio quality, and
transmit a second packet data including the packet length and transmission count to the first communication apparatus,
the first communication apparatus including a first memory; and
a first processor coupled to the first memory and the first processor configured to:
receive the second packet data, and
transmit the first packet data based on the packet length and transmission count
wherein the second processor is further configured to:
measure a response time based on transmission time of a response time measurement packet transmitted from the second processor and reception time of a response packet in the second processor, transmitted from the first communication apparatus in response to the response time measurement packet, and detect a periodic deterioration state in the radio quality based on the response time, and
receive the first packet data and transmit the second packet data, respectively, in a first period other than a period with the deterioration state;
transmit the second packet data in a notification period included in a first period other than a period with the periodic deterioration state, and
receive the first packet data in the first packet transmission period included in the first period.

18. A communication control method in a communication apparatus including a memory, and a processor coupled to the memory, and that transmits and receives packet data by radio communication with another communication apparatus, the method comprising:
receiving first packet data transmitted from the other communication apparatus in a first packet transmission period, by the processor;
calculating data collection efficiency indicating a ratio of a reception data amount of the first packet data received in the communication apparatus, to a transmission data amount of the first packet data transmitted from the other communication apparatus, based on received the first packet data, and measuring a first radio quality, there is a response time from sending a measurement packet to receiving a response packet to the measurement packet, in a radio section between the communication apparatus and the other communication apparatus, based on received the first packet data, by the processor;
calculating a packet length and transmission count of the first packet data transmitted from the other communication apparatus, based on the data collection efficiency and the first radio quality, by the processor;
transmitting a second packet data including the packet length and transmission count to the other communication apparatus, by the processor;
measuring a response time based on transmission time of a response time measurement packet transmitted from the processor and reception time of a response packet in the processor, transmitted from the other communication apparatus in response to the response time measurement packet, and detect a periodic deterioration state in the radio quality based on the response time,
receiving the first packet data and transmit the second packet data, respectively, in a first period other than a period with the deterioration state;

transmitting the second packet data in a notification period included in a first period other than a period with the periodic deterioration state, and receiving the first packet data in the first packet transmission period included in the first period.

19. A non-transitory computer-readable recording medium having stored therein a communication control program that causes a computer to execute a process comprising:

receiving first packet data transmitted from another communication apparatus in a first packet transmission period;

calculating data collection efficiency indicating a ratio of a reception data amount of the first packet data received in a communication apparatus, to a transmission data amount of the first packet data transmitted from the other communication apparatus, based on received the first packet data, and measuring a first radio quality, there is a response time from sending a measurement packet to receiving a response packet to the measurement packet, in a radio section between the communication apparatus and the other communication apparatus, based on received the first packet data;

calculating a packet length and transmission count of the first packet data transmitted from the other communication apparatus, based on the data collection efficiency and the first radio quality;

transmitting a second packet data including the packet length and transmission count to the other communication apparatus;

measuring a response time based on transmission time of a response time measurement packet and reception time of a response packet, transmitted from the other communication apparatus in response to the response time measurement packet, and detect a periodic deterioration state in the radio quality based on the response time, receiving the first packet data and transmit the second packet data, respectively, in a first period other than a period with the deterioration state;

transmitting the second packet data in a notification period included in a first period other than a period with the periodic deterioration state, and receiving the first packet data in the first packet transmission period included in the first period.

* * * * *